(12) United States Patent
Mithal et al.

(10) Patent No.: US 11,418,356 B2
(45) Date of Patent: Aug. 16, 2022

(54) ENHANCED SECURITY PREVIEW OF DIGITAL CONTENT

(71) Applicant: Nytell Software LLC, Wilmington, DE (US)

(72) Inventors: Ashish K. Mithal, North Chelmsford, MA (US); Amad Tayebi, Westford, MA (US)

(73) Assignee: Nytell Software LLC, Wilmington, DE (US)

( * ) Notice: Subject to any disclaimer, the term of this patent is extended or adjusted under 35 U.S.C. 154(b) by 0 days.

(21) Appl. No.: 16/728,621

(22) Filed: Dec. 27, 2019

(65) Prior Publication Data
US 2020/0259670 A1  Aug. 13, 2020

Related U.S. Application Data

(60) Continuation of application No. 12/497,687, filed on Jul. 5, 2009, now Pat. No. 10,554,424, which is a
(Continued)

(51) Int. Cl.
*H04L 12/14* (2006.01)
*G06Q 30/06* (2012.01)
(Continued)

(52) U.S. Cl.
CPC ......... *H04L 12/14* (2013.01); *G06Q 30/0235* (2013.01); *G06Q 30/0283* (2013.01);
(Continued)

(58) Field of Classification Search
CPC ......... H04L 12/14; H04L 63/06; H04L 63/10; H04L 2463/101; G06Q 30/0601;
(Continued)

(56) References Cited

U.S. PATENT DOCUMENTS

| | | | |
|---|---|---|---|
| 6,343,738 B1 * | 2/2002 | Ogilvie | G06Q 20/1235 705/26.1 |
| 2003/0095660 A1 * | 5/2003 | Lee | G06F 21/10 380/231 |

* cited by examiner

*Primary Examiner* — Chinyere Mpamugo
(74) *Attorney, Agent, or Firm* — Fitch, Even, Tabin & Flannery LLP

(57) ABSTRACT

A method for controlling the release of an as-rendered configuration of a digital work, comprising the steps of presenting said digital work as a composite of a plurality of layers comprising at least a first layer and a second layer; providing a rendering protocol interface which is adapted for defining said as-rendered configuration of the digital work by specifying a first rendering status of said first layer and a second rendering status of said second layer; providing a rendering protocol facility adapted for storing and controlling the release of said first and second rendering status of said first and second layers respectively in accordance with said as-rendered configuration; restricting unauthorized access to the rendering protocol interface, thereby preventing unauthorized modification of said as-rendered configuration; and releasing said digital work with said as-rendered configuration. The method has application in selling books, movies, software, music and other information products. A method of selling a preview version of an information product along with an option of purchase of the original version is described.

23 Claims, 26 Drawing Sheets

Related U.S. Application Data division of application No. 11/017,381, filed on Dec. 20, 2004, now Pat. No. 7,562,397, which is a continuation-in-part of application No. 10/307,832, filed on Dec. 2, 2002, now Pat. No. 7,316,032.

(60) Provisional application No. 60/559,628, filed on Apr. 5, 2004, provisional application No. 60/531,246, filed on Dec. 20, 2003, provisional application No. 60/363,989, filed on Mar. 14, 2002, provisional application No. 60/339,015, filed on Dec. 1, 2001.

(51) Int. Cl.
*H04L 9/40* (2022.01)
*G06Q 30/02* (2012.01)
*G11B 20/00* (2006.01)

(52) U.S. Cl.
CPC ......... *G06Q 30/06* (2013.01); *G06Q 30/0601* (2013.01); *H04L 63/06* (2013.01); *H04L 63/10* (2013.01); *G11B 20/00826* (2013.01); *H04L 2463/101* (2013.01)

(58) Field of Classification Search
CPC ............... G06Q 30/06; G06Q 30/0283; G06Q 30/0235; G06Q 30/02; G06Q 10/067; G06Q 10/109; G06Q 30/0201; G06Q 30/0276; G06Q 50/28; G06Q 30/0207–0277; G11B 20/00826; G02B 27/0172; G02B 2027/014; G02B 27/017; G02B 2027/0187; G02B 2027/0138; G02B 2027/0178; G02B 27/0093; G02B 2027/0134; G02B 2027/011; G02B 2027/0123; G02B 2027/0112; G02B 2027/012; G02B 2027/0156; G02B 2027/0174; G02B 27/0176; G02B 27/0179; G02B 5/201; G02B 2027/0185; G02B 27/01; G02B 27/0101; G02B 7/36; G02B 2027/0118; G02B 2027/0127; G02B 2027/0141; G02B 2027/0147; G02B 2027/0161; G02B 26/0816; G02B 30/00; G02B 30/24; G02B 30/26; G02B 30/30; G02B 30/34; G02B 30/40; G02B 30/52

See application file for complete search history.

Prior Art
Unrestricted Access Information Distribution Model
Open Box Model

Restricted Access Information Distribution Model
Closed Box Model

| UNMASKED CONFIGURATION | | LAYER STATUS: *In Original and Unmasked Form* |
|---|---|---|
| 2-Layer Digital Work, 60 | Masking Effect Layer, 601 | OFF |
| | Digital Content Layer, 602 | ON |

FIG. 6a

| MASKED CONFIGURATION | | LAYER STATUS: *In a Reduced Utility or Masked Form* |
|---|---|---|
| 2-Layer Digital Work, 60 | Masking Effect Layer, 601 | ON |
| | Digital Content Layer, 602 | ON |

FIG. 6b

UNMASKED CONFIGURATION

| | | LAYER STATUS: *In Original and Unmasked Form* |
|---|---|---|
| 3-Layer Digital Work, 61 | Masking Effect Layer, 601 | OFF |
| | Digital Content Layer, 602 | ON |
| | Control Layer, 603 | ACCESS ENABLED |

FIG. 6c

MASKED CONFIGURATION

| | | LAYER STATUS: *In a Reduced Utility or Masked Form* |
|---|---|---|
| 3-Layer Digital Work, 61 | Masking Effect Layer, 601 | ON |
| | Digital Content Layer, 602 | ON |
| | Control Layer, 603 | ACCESS DISABLED |

FIG. 6d

UNMASKED CONFIGURATION

| Multilayer Digital Work, 70 | | LAYER STATUS: In Original and Unmasked Form |
|---|---|---|
| | Audio Distortion Masking Layer, 701 | OFF |
| | Video Distortion Masking Layer, 702 | OFF |
| | Content Overlay Masking Layer, 703 | OFF |
| | Text Headings Layer, 704 | ON |
| | Main Document Body Layer, 705 | ON |
| | Graphics Layer, 706 | ON |
| | Photographs Layer, 707 | ON |
| | Animated Images Layer, 708 | ON |
| | Audio/Video Clips Layer, 709 | ON |
| | Java Objects Layer, 710 | ON |

FIG. 7a

HEAVILY MASKED CONFIGURATION

| Multilayer Digital Work, 70 | | LAYER STATUS: In a Reduced-Utility or Masked Form |
|---|---|---|
| | Audio Distortion Masking Layer, 701 | ON |
| | Video Distortion Masking Layer, 702 | ON |
| | Content Overlay Masking Layer, 703 | ON |
| | Text Headings Layer, 704 | ON |
| | Main Document Body Layer, 705 | ON |
| | Graphics Layer, 706 | ON |
| | Photographs Layer, 707 | OFF |
| | Animated Images Layer, 708 | ON |
| | Audio/Video Clips Layer, 709 | ON |
| | Java Objects Layer, 710 | OFF |

FIG. 7b

LIGHTLY MASKED CONFIGURATION

LAYER STATUS: In a Reduced-Utility or Masked Form

| Multilayer Digital Work, 70 | Layer | Status |
|---|---|---|
| | Audio Distortion Masking Layer, 701 | OFF |
| | Video Distortion Masking Layer, 702 | ON |
| | Content Overlay Masking Layer, 703 | OFF |
| | Text Headings Layer, 704 | ON |
| | Main Document Body Layer, 705 | ON |
| | Graphics Layer, 706 | ON |
| | Photographs Layer, 707 | ON |
| | Animated Images Layer, 708 | ON |
| | Audio/Video Clips Layer, 709 | ON |
| | Java Objects Layer, 710 | ON |

FIG. 7c

ORIGINAL AND UNMASKED CONFIGURATION

| DIGITAL WORK, 80 | DIGITAL CONTENT COMPONENTS | RENDERING PROTOCOL *In original and Unmasked Form* | | | |
|---|---|---|---|---|---|
| | | Digital Content | Masking Effect A, 82 | Masking Effect B, 84 | Masking Effect C, 86 |
| | HTML Pages, 801 | ☒ | ☐ | ☐ | ☐ |
| | Images, 802 | ☒ | ☐ | ☐ | ☐ |
| | Embedded Objects, 803 | ☒ | ☐ | ☐ | ☐ |
| | Audio Content, 804 | ☒ | ☐ | ☐ | ☐ |
| | Video Content, 805 | ☒ | ☐ | ☐ | ☐ |
| | Database Field 1, 806 | ☒ | ☐ | ☐ | ☐ |
| | Database Field 2, 807 | ☒ | ☐ | ☐ | ☐ |

☒ (85) Indicates ON    ☐ (87) Indicates OFF

FIG. 8a

MASKED CONFIGURATION

| DIGITAL WORK, 80 | DIGITAL CONTENT COMPONENTS | RENDERING PROTOCOL *In Reduced Utility or Masked Form* | | | |
|---|---|---|---|---|---|
| | | Digital Content | Masking Effect A, 82 | Masking Effect B, 84 | Masking Effect C, 86 |
| | HTML Pages, 801 | ☒ | ☒ | ☐ | ☐ |
| | Images, 802 | ☒ | ☒ | ☐ | ☐ |
| | Embedded Objects, 803 | ☒ | ☐ | ☐ | ☒ |
| | Audio Content, 804 | ☒ | ☐ | ☒ | ☐ |
| | Video Content, 805 | ☒ | ☒ | ☐ | ☐ |
| | Database Field 1, 806 | ☒ | ☐ | ☐ | ☒ |
| | Database Field 2, 807 | ☒ | ☐ | ☐ | ☒ |

☒ (85) Indicates ON    ☐ (87) Indicates OFF

FIG. 8b

ORIGINAL AND UNMASKED CONFIGURATION (R-rated)

| MOVIE SCENES | | RENDERING PROTOCOL *R rated, original & unmasked form* | | | |
|---|---|---|---|---|---|
| | | Digital Content, | Masking Effect G1, 92 | Masking Effect G2, 94 | Masking Effect G3, 96 |
| DIGITAL MOVIE, 90 | Scene Sequence, 901 | ☒ | ☐ | ☐ | ☐ |
| | Scene Sequence, 902 | ☒ | ☐ | ☐ | ☐ |
| | Scene Sequence, 903 | ☒ | ☐ | ☐ | ☐ |
| | Scene Sequence, 904 | ☒ | ☐ | ☐ | ☐ |
| | Scene Sequence, 905 | ☒ | ☐ | ☐ | ☐ |
| | Scene Sequence, 906 | ☒ | ☐ | ☐ | ☐ |
| | Scene Sequence, 907 | ☒ | ☐ | ☐ | ☐ |

☒ (95) Indicates ON    ☐ (97) Indicates OFF

FIG. 9a

MASKED CONFIGURATION (G rated)

| MOVIE SCENES | | RENDERING PROTOCOL *G rated, masked form* | | | |
|---|---|---|---|---|---|
| | | Digital Content, | Masking Effect G1, 92 | Masking Effect G2, 94 | Masking Effect G3, 96 |
| DIGITAL MOVIE, 90 | Scene Sequence, 901 | ☒ | ☐ | ☐ | ☐ |
| | Scene Sequence, 902 | ☒ | ☒ | ☐ | ☐ |
| | Scene Sequence, 903 | ☒ | ☐ | ☐ | ☐ |
| | Scene Sequence, 904 | ☐ | ☐ | ☐ | ☐ |
| | Scene Sequence, 905 | ☒ | ☒ | ☐ | ☐ |
| | Scene Sequence, 906 | ☒ | ☒ | ☐ | ☐ |
| | Scene Sequence, 907 | ☒ | ☒ | ☐ | ☐ |

☒ (95) Indicates ON    ☐ (97) Indicates OFF

FIG. 9b

MASKED CONFIGURATION (PG rated)

| | MOVIE SCENES | RENDERING PROTOCOL  *PG rated, masked form* | | | |
|---|---|---|---|---|---|
| | | Digital Content, | Masking Effect G1, 92 | Masking Effect G2, 94 | Masking Effect G3, 96 |
| DIGITAL MOVIE, 90 | Scene Sequence, 901 | ☒ | ☐ | ☐ | ☐ |
| | Scene Sequence, 902 | ☒ | ☐ | ☒ | ☐ |
| | Scene Sequence, 903 | ☒ | ☐ | ☐ | ☐ |
| | Scene Sequence, 904 | ☒ | ☐ | ☒ | ☐ |
| | Scene Sequence, 905 | ☒ | ☐ | ☒ | ☐ |
| | Scene Sequence, 906 | ☒ | ☐ | ☐ | ☐ |
| | Scene Sequence, 907 | ☒ | ☐ | ☐ | ☐ |

☒ (95) Indicates ON    ☐ (97) Indicates OFF

FIG. 9c

MASKED CONFIGURATION (PG-13 rated)

| | MOVIE SCENES | RENDERING PROTOCOL  *PG-13 rated, masked form* | | | |
|---|---|---|---|---|---|
| | | Digital Content, | Masking Effect G1, 92 | Masking Effect G2, 94 | Masking Effect G3, 96 |
| DIGITAL MOVIE, 90 | Scene Sequence, 901 | ☒ | ☐ | ☐ | ☐ |
| | Scene Sequence, 902 | ☒ | ☐ | ☐ | ☒ |
| | Scene Sequence, 903 | ☒ | ☐ | ☐ | ☐ |
| | Scene Sequence, 904 | ☒ | ☐ | ☐ | ☒ |
| | Scene Sequence, 905 | ☒ | ☐ | ☐ | ☐ |
| | Scene Sequence, 906 | ☒ | ☐ | ☐ | ☐ |
| | Scene Sequence, 907 | ☒ | ☐ | ☐ | ☐ |

☒ (95) Indicates ON    ☐ (97) Indicates OFF

FIG. 9d

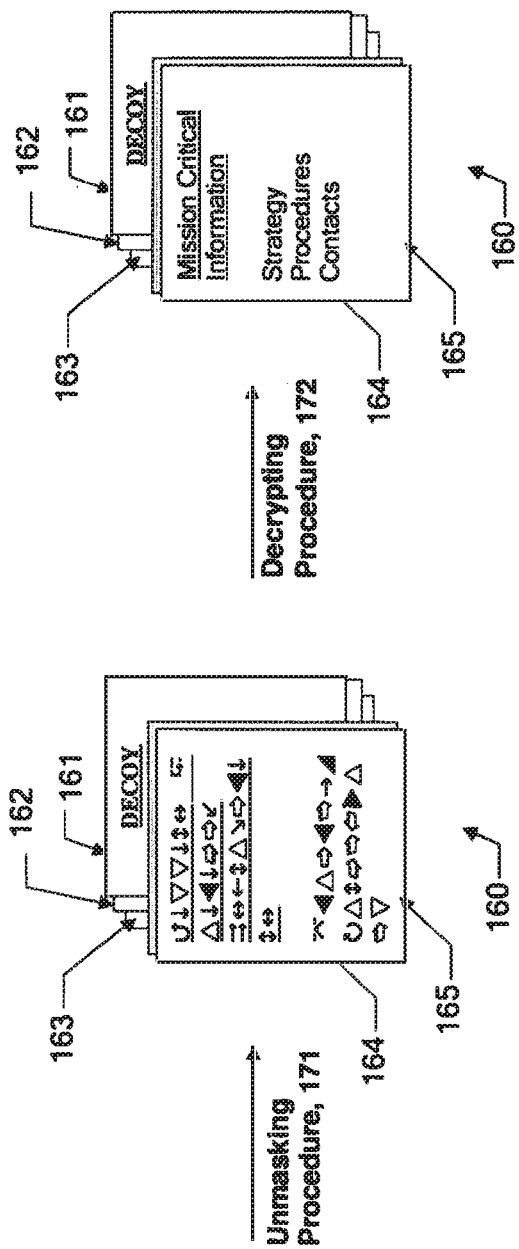
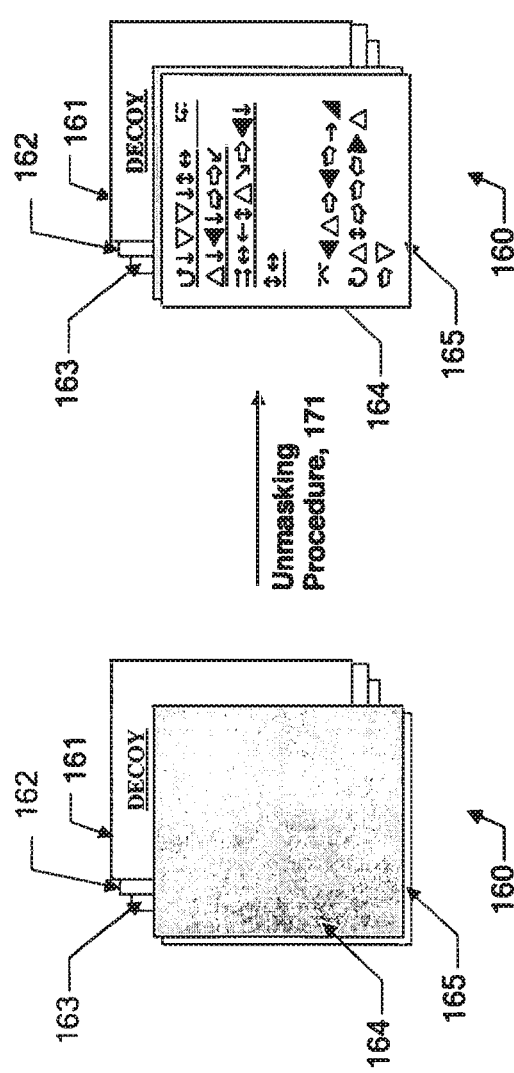

ENHANCED SECURITY PREVIEW OF DIGITAL CONTENT

CROSS-REFERENCE TO RELATED APPLICATIONS

This application is a continuation of U.S. patent application Ser. No. 12/497,687, filed Jul. 5, 2009, titled ENHANCED SECURITY PREVIEW OF DIGITAL CONTENT which is a divisional of U.S. patent application Ser. No. 11/017,381, filed on Dec. 20, 2004, now U.S. Pat. No. 7,562,397, titled METHOD AND SYSTEM FOR FACILITATING SEARCH, SELECTION, PREVIEW, PURCHASE EVALUATION, OFFERING FOR SALE, DISTRIBUTION AND/OR SALE OF DIGITAL CONTENT AND ENHANCING THE SECURITY THEREOF, which in turn claims the benefit of two provisional applications identified by Ser. No. 60/531,246, filed on Dec. 20, 2003 and Ser. No. 60/559,628, filed on Apr. 5, 2004. U.S. patent application Ser. No. 11/017,381 is a continuation-in-part of U.S. patent application Ser. No. 10/307,832, filed on Dec. 2, 2002, now U.S. Pat. No. 7,316,032, titled METHOD FOR ALLOWING A CUSTOMER TO PREVIEW, ACQUIRE, AND/OR PAY FOR INFORMATION AND A SYSTEM THEREFOR which in turn claims the benefit of two provisional applications identified by Ser. No. 60/339,015 filed on Dec. 1, 2001 and Ser. No. 60/363,989, filed on Mar. 14, 2002. These applications are incorporated herein by reference along with all their priority documents, in their entirety, for all purposes.

FIELD OF THE INVENTION

This invention relates generally to a method for distribution and/or sale of digital works or information products. More particularly, this invention relates to a method and system for facilitating various functional, commercial and transactional steps in distributing an information product including—searching, selecting, previewing, purchase evaluation, offering for sale, marketing, providing access, transmitting, rendering, conveying, shipping, on-demand delivery, renting, and/or selling said information product.

BACKGROUND OF THE INVENTION

The explosive growth of public and private information networks has revolutionized the way information is stored, accessed and used. The Internet, in particular, holds promise of becoming the ultimate repository, publishing medium, and distribution engine for all kinds of information and electronic or digital content.

Information products such as books, music and movies, once represented in a digital format are accessed on a computer-based system having the capability to recreate (read, display, or playback) the digital content. Digital information products, on one hand, offer some inherent advantages over traditional mediums of representation such as paper, film and analog tape media; on the other hand, they also pose some formidable content protection challenges and security threats compared to their physical counterparts due to certain inherent properties of digital content:

(a) A physical artifact such as a paper book or analog tape can be shared only when the owner parts away from his or her possession and loans it out to a singular person at a time. However, a digital copy can be readily distributed while the owner remains in possession of the original at all times.

(b) A physical artifact requires physical delivery of the object to another user and the traditional impediments of time, distance and costs are involved in sharing a physical artifact. Any digital information product can be delivered or shared across the globe via the Internet with anyone having access to the World Wide Web. Thus, physical distance is obliterated over the Internet.

(c) Digital content does not have physical weight. However, it needs to be stored on either physical media or on computer hardware having storage and/or memory capabilities.

(d) Duplication of a paper book or analog tape involves duplication costs and some deterioration in quality over successive generations of copies However, in the case of digital content, identical-to-original copies can be generated without a loss in quality and mass-distributed with the simplicity of a mouse click. In other words, there is no loss of fidelity or deterioration in quality of display or playback across generations of copies. In most instances it is almost impossible to differentiate a digital copy from a digital original.

(e) Mass distribution of a physical artifact such as a paper book, tape, cassette etc. requires considerable resources including space, equipment, infrastructure, people and money. In the case of digital content multiple copies of an information product need not be stored separately, for mass distribution, and can be generated upon demand using a personal computer. Thus, the costs of duplication, reproduction, dissemination and distribution of digital content are considerably reduced compared to traditional methods of printing, publishing and recording. The cost of carrying one copy of a digital work is practically no different than carrying a large number of copies of the same digital work.

The inherent characteristics of digital content coupled with the networking power of the Internet pose several challenges in distributing and selling information products. Fundamentally, the problem is that any transaction relating to providing access to an information product or digital content invariably involves copying. In fact, computer programs are run by copying them from disk/storage to memory (RAM, or random access memory); and, web pages are viewed by copying them from a remote computer to a local machine or other display/playback device(s).

The seller's dilemma, from a commercial standpoint, is that even prior to selling, digital content has to be "offered for sale or purchase evaluation." Once the content is offered for sale it can be readily duplicated and distributed. Thus, even when access is provided to digital content for examination, preview, or purchase evaluation purposes the same information can be copied and distributed without rewarding or compensating the content publisher or creator. If the seller or distributor adopts a restrictive approach for protecting content prior to its sale it does not facilitate the selling process, as a purchaser characteristically desires to at least examine the goods prior to purchasing them.

In addition, the very act of selling requires the seller to deliver a copy of the digital work to the buyer, which can be read, played, enjoyed and also readily copied and mass-distributed. In fact, each new sales transaction can adversely affect future sales as it increases the statistical probability of unauthorized mass distribution. Even in the case of encrypted content distribution schemes content is protected only until purchased. Once purchased and decrypted the content can be redistributed in a non-protected format. Secondary distribution of encrypted content in a non-protected form is a primary problem for content owners and distributors.

These inherent characteristics of digital content and the increasing ease with which intellectual property (IP) can be represented, stored, replicated, and mass distributed, without payment of due consideration, are issues of great concern to the content creators, publishers and distributors. Any unauthorized distribution of digital works results in a loss of revenue to the content provider or publisher and an unpaid royalty to the author or creator. Unauthorized distribution of analog content, such as—sharing of books, music and movies stored on traditional analog media such as paper, audio and video tapes has existed for a long time but has been mostly confined to an individual's circle of influence. In contrast, unauthorized distribution of digital content can be significantly more damaging as identical-to-original illegal copies can be made readily available over the Internet and distributed en masse. The legal precedent established by the ruling against Napster—the song-swapping website—shows that a wide spread duplication and unauthorized dissemination of digital content through a widely used public medium, such as the Internet, jeopardizes the Intellectual Property (IP) ownership rights of authors, artists, musicians, recording studios and content providers.

Unauthorized distribution is not merely an economic or revenue problem for the content distributor but affects the entire society. The economic rewards to the content creators and distributors provide the incentive for continuation of the innovation cycle and fostering further creation of new works benefiting society as a whole. Unrewarded distribution of digital works is not conducive to further creation of digital works which, the founding fathers of the US constitution aimed at encouraging by empowering the law-makers—"to promote the progress of science and the useful arts by securing to authors and inventors for limited times exclusive rights in their respective writings and discoveries."

Despite the numerous advantages offered by digital content, representing content or IP in a digital form is not an end in itself; it can only serve the broad interests when the digital representation does not undermine or otherwise dilute the time-limited monopoly granted to the authors or creators of the content by the US Constitution. In order to preserve the commercial value of information products and provide continued incentive to content creators for expanding the public domain of ideas, information, creative works and technological innovation—the economic interests of content creators and publishers must be protected.

REVIEW OF THE PRIOR ART

The problems associated with distributing digital content and deterring unauthorized and unaccounted distribution and usage of such content have been described in the prior art. An excellent review of technical mechanisms and other methods including business models, intended for protecting intellectual property (IP) in digital form, is provided in a published National Research Council Report (NRC), titled *The Digital Dilemma: Intellectual Property in the Information Age* (National Academy Press, Washington, D.C., 2000), authored by the Committee on Intellectual Property Rights and the Emerging Information Infrastructure, convened by the Computer Science and Telecommunications Board (CSTB). Although, conventionally IP protection is typically conceived in legal and technical terms, the NRC report underscores the fact that business models can serve as effective means of making digital content available in new ways that can be an effective deterrent to illegitimate uses of IP.

A principal technology that has been used for protecting digital content is cryptography. Cryptography or "encryption" involves scrambling or "encrypting" digital content and rendering it unusable until a legitimate party can unscramble or "decrypt" it. Encryption facilitates IP management by protecting content against disclosure or modification during transmission and while it is stored. If content is encrypted effectively, copying the files is nearly useless because there is no access to the content without the decryption key.

In "symmetric-key" encryption, the same key is used for both encrypting and decrypting. Information products, such as movies, songs, books, art and similar works can be distributed in an encrypted form while the decrypting key is only provided to authorized users (e.g. paying customers). This technique of distributing content, in a protected form, is customarily employed in cable television with pay-per-view programming where the decrypting key is provided to the paying customers utilizing special hardware (set-top cable box). The encrypted program can be safely broadcast without fear of unauthorized access due to decryption procedure required for viewing the specific pay-per-view programming.

In public-key cryptography, two different keys or "key-pairs" are used—a public key and a private key. Any message encrypted with the public key cannot be decrypted by using the same public key and requires a corresponding private key to decrypt it. Private keys are kept private by individuals, while public keys are made widely available or published. Secret messages intended for the recipient can be encrypted using the recipient public key. Once the message is encrypted, only the recipient, who knows the corresponding private key, can decrypt the message. Software is widely available to generate key pairs that have this property.

A combination of symmetric key and public-key encryption schemes is also used wherein symmetric-key encryption is used to encrypt the message, and then public-key encryption is used to transmit the decryption key to the recipient. Other applications of public key encryption are "digital signatures" and "identity certificates." Digital signatures involve a private signing key.

In the prior art, copy protection and access control schemes rely principally on software-based encryption, hardware keys or a combination thereof. In terms of specific controls these techniques work by—(a) restricting a user to make additional copies; (b) requiring special purpose hardware to limit access to digital information; (c) anchoring content to a single machine; (d) packaging content in an encrypted container; (e) attaching usage rights to the content via XML tags; (f) fingerprinting and watermarking.

Software-based encryption techniques prevent conventional copying programs from making unauthorized usable copies. Generally, in these protection techniques, the execution of programs or information stored on a storage medium involves the presence of decryption key for display or execution of data. U.S. Pat. No. 5,027,396 ('396) describes a technique for execution protection of a floppy disk using an encrypted password located at an arbitrary location within the data. Other examples of prior art teachings discussed and referred to in '396, incorporated herein by reference, are directed towards copy-protecting disks or storage media in general see for e.g. U.S. Pat. Nos. 4,577,289; 4,462,078; 4,584,641; 4,734,796; 4,785,361; 4,849,836.

In the prior art, a technique for restricting access and use of digital information to a particular machine or "anchoring" content to a single machine is described in U.S. Pat. No.

4,817,140 assigned to IBM. This technique is also referred to as hardware based authorization. U.S. Pat. No. 4,732,284 describes a hardware authentication utilizing public-key encryption techniques. Other examples of secure communication systems utilizing encryption or controlled distribution are described in U.S. Pat. Nos. 4,888,800 and 4,999,806.

Combinations of software based method and hardware key are described in U.S. Pat. Nos. 4,866,769 and 4,903,296. A method for preventing copying of a video program is described U.S. Pat. No. 4,907,093. A method of preventing unauthorized duplication of information from one storage medium to another and further restricting the use of information to one or more designated devices is described in U.S. Pat. No. 5,412,718.

U.S. Pat. No. 5,513,260 describes a method and apparatus for copyright protection of various recording media such as compact discs (CDs) utilizing a combination of symmetrical and asymmetrical data encryption to permit the player to handle either copy-protected or non-copy-protected media.

A method for invoking business operations and encouraging purchase of executable and non-executable software for distribution of digital information is disclosed in U.S. Pat. No. 5,509,070. This method requires the user to obtain an ID unique to the user for obtaining access to the advanced features.

Another method of protecting digital information particularly software is making the software product available for a pre-determined and limited time period such that the program is rendered unusable after the expiry of the allowed time-period. Methods and apparatuses for enabling trial period use of software products are covered under U.S. Pat. Nos. 5,563,946, 5,598,470, 5,689,560 and 5,737,416. A limited trial period can be effective for software products; however, it does not provide a solid business model for delivering other digital content such as books, music and movies due to several reasons. Firstly, even a singular use of the content is disincentive enough for paying or purchasing and secondly, once access is provided in a decrypted form it can be readily stored, displayed and distributed after the trial period has expired.

A method and apparatus to create, distribute, sell and control access to digital documents using secure cryptographic envelopes is described in U.S. Pat. No. 5,673,316 assigned to IBM Corporation. This technology has been commercialized under the IBM's trademark CRYPTOLOPE. Cryptolope objects are used for secure, protected delivery of digital content. Cryptographic envelopes can be compared to the other major technical approach to the same problem, secure servers. A cryptolope is a self-contained and self-protecting object and may include a variety of content types including text, images and audio. It can be delivered across a network or placed on a CD-ROM or other storage media and ties the usage conditions (for e.g. price) to the content itself.

Other technologies for controlling and distributing electronic content have been developed by Content Guard, Inc. and Xerox Corporation (http://www.contentguard.com) and have been described in US Pat Nos. listed below and herein included by reference—"Interactive Contents Revealing Storage Device" (U.S. Pat. No. 5,530,235); "System for Controlling the Distribution and Use of Digital Works" (U.S. Pat. No. 5,629,980); "System for Controlling the Distribution and Use of Digital Works Having a Free Reporting Mechanism" (U.S. Pat. No. 5,634,012); "System for Controlling the Distribution and Use of Composite Digital Works" (U.S. Pat. No. 5,638,443); "System for Controlling the Distribution and Use of Digital Work Having Attached Usage Rights Where the Usage Rights are defined by a Usage Rights Grammar" (U.S. Pat. No. 5,715,403); "System for Controlling the Distribution and Use of Rendered Digital Works through Watermarking" (U.S. Pat. No. 6,233,684); "System for Controlling the Distribution and Use of Digital Works Using Digital Tickets." (U.S. Pat. No. 6,236,971).

Technologies to manage, secure, control and automate the flow of content and the access to services over a network are frequently referred to Digital Rights Management (DRM) Technologies. Content Guard is a provider of Digital Rights Management (DRM) technologies through XrML, eXtensible Rights Markup Language. XrML is a language to specify rights. XrML is an XML based usage grammar for specifying rights and conditions to control the access to digital content and services. Using XrML, the owners and distributors of digital resources (including content, services or software) can identify the parties allowed to use those resources, the rights available to those parties, and the terms and conditions under which rights may be exercised. Other uses of XrML and its application to development of business models for distributing digital content and services over a network or Internet are discussed in Content Guards's White Paper, "The Need for a Rights Language", 2001 (also available on the web at: http://www.xrml.org/reference.asp).

A system for controlling access and distribution of digital property, herein included by reference, is disclosed in U.S. Pat. No. 5,933,498. In this prior art teaching access to protected portions of the data, in a useable form, is prevented. Access to the protected portions of the data is only provided in accordance with rules or access rights as enforced by a mechanism protected by a tamper detection feature.

In addition to encryption, other techniques for protecting digital content include "watermarking and "fingerprinting" The use of watermarks for the purpose of identifying the manufacturer and quality of a paper discreetly is well known. Watermarking techniques have also been employed for preventing forgery of banknotes and checks (see for e.g. U.S. Pat. Nos. 5,122,754 and 5,538,290).

Analogous to paper making digital watermarks can be used to mark each individual copy of a digitized work with information identifying the title, copyright holder, and even the licensed owner of a particular copy. A method and system for digital watermarking is described in U.S. Pat. No. 5,905,800 herein incorporated in its entirety by reference. A method for applying a digital watermark to a content signal is disclosed. The method includes identifying a binary sequence watermarking key and applying the binary sequence to the content signal. The digital watermark is then encoded within the content signal at one or more locations determined by the watermarking key.

Another prior art teaching U.S. Pat. No. 5,195,135 discloses a method and apparatus for the automatic censorship of audio-video programming at the receiver in accordance with a viewer-selected censorship mode and classification data encoded in the audio-video programming signal. The censorship classification data comprise codes that classify the programming for several different subjects and several different censorship levels. Censorship of the audio-video programming is accomplished by automatically obscuring the audio and/or video signal by blurring the audio or video frame.

U.S. Pat. No. 6,216,228, herein incorporated in its entirety by reference, describes a method and a system for automatically controlling display of video or image data in accordance with content classification information embedded in the form of digital watermarks. A controller decodes the watermarked content codes and then prevents displaying of certain material, by overlaying the display with blanking data, if the codes match certain stored codes, which the controller has been set to respond to. The use of invisible digital watermark codes by a controller, which operates in response to the watermark codes, provides reliable control since the codes are more difficult for unauthorized persons to detect and remove than other embedded codes would be. U.S. Pat. No. 6,216,228 is directed towards censorship and screening of sensitive, adult and pornographic content. Other US Patents that disclose similar parental control features include for example, U.S. Pat. Nos. 4,930,158; 4,930,160; 5,253,066 and 5,387,942.

Digital watermarks are applied in a variety of ways and for a variety of purposes. Watermarks can vary according to the type of content they are affixed to: text, images, audio or video. Watermarks may be visible or imperceptible to the user. The embedded watermark may be a text, image, signal or a code. Typically watermarks contain information about the provider or publisher. The term fingerprinting is often used to connote marks that carry information about the end user and are essentially employed for tracing information about the user.

The practical applications of watermarking are not so much a deterrent for private copying as an aid to police wide scale commercial pirating of digital content. Typical uses of digital watermarking and fingerprinting are: (a) to confirm genuineness and integrity of the content; (b) to authenticate ownership of a digital work; (c) to introduce an electronic fingerprint for preventing or tracing piracy or unauthorized duplication; (d) to mark a digital work, when digital watermark is keeping additional information about the product itself such as time and date stamping of photographs; (e) for censorship of sensitive content.

Superposition or overlays have been described in the prior art. A digital Image Overlay System and Method for overlaying one digital image on another digital image is described in U.S. Pat. No. 5,283,867. More particularly this method describes transferring and reformatting a block of image data from a bit-planar organized, source memory and overlaying it onto an image stored in a display target memory. This prior art teaching is particularly directed at image overlays in presentations and picture-to-picture transitions and does not teach a method of physically masking digital content for the purpose of distributing digital content.

A device for distribution of a digital music information object is described in U.S. Pat. No. 5,636,276. The digital music information object is composed of a core and a number of additional layers; wherein, the core includes an encryption table, for interacting with encryption and decryption modules of the system. The additional layers may include audio layer class, score layer class, text layer class and video layer class. Again, this prior art teaching does not describe a masking effect or a masking layer, which is removable at the time of purchase.

A system and method for providing annotation overlays from diverse sources of commentary for World-Wide Web document is disclosed in U.S. Pat. No. 5,826,025. Again, this prior art teaching does not discuss removable masking or overlays as a part of the distribution process.

PROBLEMS ASSOCIATED WITH PRIOR ART DISTRIBUTION MODELS

To summarize, majority of prior art information distribution models fall under two categorical extremes—"Unrestricted Access—i.e. complete and open access" or "Restricted Access—substantial prevention of access". In the former case the content has little commercial value since it is freely distributed, and in the latter case the consumer has to take the leap of faith prior to making a purchase decision. Prior art techniques for protection against unauthorized use of digital content rely primarily on preventing access to a digital work; or, allowing access to the digital work only in an encrypted form; and, thereby not allowing the customer to preview, display or use the digital work without paying for it. Thus, content protection technologies provide mechanisms for Protection of digital data or Rights Management for content creators and distributors; however, they do not necessarily facilitate the purchase decision process for the consumer. The consumer is only granted a very limited access to the preview material for determining if the content under evaluation is a worthwhile purchase.

FIG. 1a and FIG. 1b, show conceptual representations of the distribution models based on unrestricted and restricted access schemes respectively.

The unrestricted access information distribution model, shown in FIG. 1a, is referred to as the "Open-Box Model" and denotes free and unrestricted access to the unencrypted content object. The content label on the box analogically describes the contents of the box by—an abstract of the content material, or excerpts therefrom, or preview of the underlying content. Due to readily available unrestricted access to the unencrypted content object the "unrestricted access information distribution model" is not deemed suitable for commercial distribution of digital content.

The restricted access information distribution model, shown in FIG. 1b, is referred to as the "Closed-Box Model" and denotes restricted or conditional access to the encrypted content object. The restricted access information distribution model requires certain obligations to be met prior to the release or decryption of the encrypted content object. It is worth noting that even if, unrestricted access can be provided to the encrypted content object, it would have little or no utility until it is decrypted. A key feature of the restricted access model is that information products of commercial value are typically made available only upon exchange of monetary consideration between the user and the distributor or content provider, and typically the user receives very limited or insufficient access to the information product being offered for sale. In other words, no access is provided to the "content object" or "the body of the document or digital work" unless some form of payment has been received from the user. Again, this controlled access to the point of prohibiting the user from seeing, hearing or reading what he/she intends to purchase is exercised because of the fact that access to digital information and its subsequent use invariably involves making a copy.

However, restricting access to digital content, prior to a commitment of purchase by the consumer, affects the quality and quantity of information available to the user or consumer for making a purchase decision.

The fundamental tenet of the restricted access model is NO PAYMENT, NO ACCESS (NPNA). The Restricted Access Model does not allow the user to gain access to the main body of the Information product, even for preview or purchase decision purposes. The conditional restriction posed by NPNA frequently leads to the consumer behavior of NO PREVIEW ACCESS, NO PURCHASE (NPANP) resulting in an economic stalemate for both the seller and purchaser. Thus, in effect both the distributor and the consumer are adversely affected by the restricted access system; the distributor looses revenue due to being unable to attract a sale, while the consumer is prohibited from deriving pleasure or value from the information product. It may be argued that it is such restrictive systems, for distribution of digital content, that have encouraged file-swapping and music-sharing web services to be created.

As an illustrative example, it would be instructive to compare selling models in the analog and digital environments for books. It is quite customary for a reader to walk into a local bookstore and up to one of the bookshelves and physically examine and browse through a book or several books prior to making a purchase. However, in the digital environment the reader would typically be presented with—a brief description of the book, excerpts from the book, table of contents, and/or testimonials of readers—but in most cases will not have the same kind of preview access as that available at the local bookstore. Thus, in the digital environment the information available to the reader at the "point of purchase" for previewing and purchase determination, is of an inferior quality and significantly less in quantity compared to that available to the reader during a physical browse-through at the local bookstore. Yet, the digital distributor cannot afford to provide the type of access to the content as a local bookstore would since it would be the commercial equivalent of selling the book for free. Therefore, in the above example, the electronic information received or previewed by the reader is of an inferior quality compared to that obtained by the reader during a physical trip to the local bookstore and actually examining the printed book, in its entirety, prior to its purchase.

How can then a distributor offer an information product for sale or invite a customer for preview and purchase evaluation when the content once shared can be freely distributed and copied? The difficulty of protecting digital content that the distributor is trying to seek buyers for is described in US Patent Publication 2003/0163724 (PUB '624), which is incorporated herein by reference.

In the present invention, the problems associated with primary and secondary distribution of digital content are addressed. Furthermore, the current invention is directed to facilitating various transactional or interactive steps involved in the process of selling digital content including searching; selecting; previewing; offering for sale or purchase evaluation; and providing controlled access to the digital content. Additionally, the present invention provides a method for protecting digital content and enhancing the security thereof.

SUMMARY OF THE INVENTION

Unmet Needs and Problems Addressed by this Invention

Conducting any transaction, exchange or activity over the Internet or similar public network, essentially requires for it to occur in a protected, safe, secure and/or discreet manner. Since any activity over the Internet or similar network medium, inevitably involves digital content, protecting digital content has become a universal need and one of the highest priorities for utilizing the Internet for personal, commercial, business or government use.

The present invention addresses the need for providing controlled access to an information product without compromising its sale value, and enabling the user or consumer to make a better purchase decision—by providing a novel technique for representing content in a "reduced utility" or "preview" or "masked" configuration. In accordance with the present invention access control is exercised by applying a masking effect to digital content so that it can be readily distributed as preview material, however, complete access is only provided upon completion of an authentication or purchase procedure established by the distributor. The "preview", or "masked" or "reduced-utility configuration facilitates the selling process as the preview content can be readily used as a marketing tool for "offering for sale" or "purchase evaluation" purposes.

A typical problem with encryption is that there are two primary states of an information product—"clear text" in which it is fully usable and unsecured and "cipher text" when it is completely unusable. Thus, access is provided in "all or nothing" fashion. Encrypted content or "cipher text" by its very definition cannot be readily used as "preview content" since previewing and/or access is prevented until conditions for decrypting the content are satisfied. The current invention provides the possibility of a new state for an information product and can be conceptually understood as "masked text" state. The masked state of a digital content can be employed for preview, purchase evaluation or decoy purposes.

The current invention also addresses the need for presenting digital content in a "preview configuration" or "masked configuration" that has a high degree of "relevance" to the original digital content. Developing a system for offering an information product for sale wherein the "preview content" is substantially representative of the "original and intended content", and that in addition, does not compromise the commercial value of the information product (or render it worthless) offers several challenges:

Firstly, any attempt at increasing the "relevance" between the "preview digital content" made available for a purchase decision prior to sale, and the "original information product" which the user would receive after the sale is consummated, in a manner that the former is substantially and truly representative of the latter, almost immediately compromises the value of the information product or removes the necessity and the incentive or motivation for its purchase.

Secondly, "relevance" itself is an abstract notion. Relevance between preview content and original content is not absolute but is a subjective relationship dependent on the type of content or information product; subject matter; user's interest, motivation, knowledge, skill level and other behavioral factors. For one user quality of the preview content may determine relevance while for the other user the quantity of available preview content may be more important. For instance, the preview version of a video information product such as a movie may be offered with "a muting effect" for showing a particular action sequence in the movie and may be considered relevant preview by one user group; while another user group which might be interested in the vocal exchange or the sound track might assign very low relevance to the preview.

Thirdly, there are fundamental difficulties associated with a seemingly endless variety of formats and file structures for representing information products and digital works. Virtually, all information that can be represented by words, numbers, graphics, or system of commands and instructions can be formatted into digital information. However, providing a content distribution system that may be integrated with all combinations of software, hardware and rendering, display or playback devices presents numerous challenges.

Fourthly, digital content is delivered by various mediums such as Television, Cable, Satellite transmissions, Telephone lines, Wireless networks, and over public and private networks including the Internet. Adopting a preview system that will prove suitable for all types of contents and transmission mediums poses varied challenges.

The current invention addresses the problem of secondary distribution of digital content and the need for protecting digital content after it has been distributed or purchased by a user. In typical commercial content distribution schemes encrypted content is protected only until purchased. Once purchased and decrypted the content can be redistributed in a non-protected format.

Another problem with cryptographically secured digital content package is that despite the fact the contents may be encrypted the source of the message is identifiable and as such these messages may be intercepted or potentially misused by unauthorized parties having adverse interests to the authorized or intended entity or user(s). This might be of particular concern when delivering classified information relating to national security, military intelligence or war strategy or similar mission critical purposes.

The present invention addresses the above identified needs, and:

(a) provides an improved method for securing and protecting digital content prior to its distribution to an authorized user or purchaser;

(b) provides an improved method for securing and protecting digital content during secondary distribution by a purchaser or user or distribution within a peer-to-peer network system;

(c) provides an improved method for offering, displaying and distributing digital content that provides adequate and relevant exposure to the digital work or information product for potential purchase or preview purposes;

(d) facilitates the process of selling an information product by providing an improved purchase decision framework with relevant preview and "point of purchase" options;

(e) provides increased fidelity or relevance between preview digital content and the original information product by allowing customers to preview digital content that is derived from the original information product in a substantially deterministic way and in accordance with user preferences or interests, for making purchases;

(f) provides protection against compromise in the commercial sale-value of the original information product by premature disclosure of the information product in its entirety or full-utility configuration.

(g) provides a reliable method for delivering mission-critical content in a inconspicuous manner.

(h) provides multi-level protection for sensitive content targeted for a plurality of users having various security levels.

(i) addresses the need for providing a "preview configuration" of an information product, that can be dynamically generated on-demand based on user input or selection in accordance with his/her needs, interests or preferences.

As will become clear from the ensuing description, in its simplest form the present invention provides for a "Mask" or "Masking Effect" that is superposed on an information product for the purposes of providing—either a preview of the original content albeit in a reduced utility format; or for enabling a consumer to make a purchase decision regarding the original content; or for veiling the original content for providing additional protection; or for concealing or hiding of the original content including its context or nature; or for misinforming unauthorized recipients regarding original content or camouflaging the original and intended content. The type, nature, placement and removal of the mask or masking effect can be tailored in accordance with the type, nature, value, importance and purpose of the original content.

OBJECTS OF THE INVENTION

In accordance with the above, an object of this invention is to facilitate various functional, commercial and transactional steps in distributing an information product including—searching, selecting, previewing, purchase evaluation, offering for sale, marketing, providing access, transmitting, rendering, conveying, shipping, on-demand delivery, renting, and/or selling said information product. An important aspect of the invention is that an information product, of potential commercial value, is made accessible to a potential receiver, in a masked, distorted or reduced utility configuration for preview, selection or purchase evaluation purposes; while, full access, rendering, conveying, transmitting or shipping, of said information product in its original and intended configuration, is allowed only upon authentication, activation, initiation, payment, confirmation of authorization to charge, or receipt of due consideration.

Another object of the present invention is to facilitate protection of original and intended content by concealing the original and intended content by superposing a content mask or masking effect.

Another object of the present invention is to provide free and uncompensated access to an information product, having a finite commercial value, in a reduced-utility configuration for previewing and enabling the consumer to make a meaningful purchase decision regarding said information product.

An additional object of the present invention is to make an information product, of potential commercial value, accessible to a potential receiver, in a masked, distorted or reduced-utility configuration for preview, search, selection or purchase evaluation purposes.

Another object of the present invention is to dynamically generate a masked or reduced-utility version of an original information product in accordance with input from the user for enabling the user to preview, evaluate and make a qualified purchase or use decision regarding said information product.

Another object of the present invention is to provide an innocuous appearing digital camouflage for masking and protecting important and mission critical content.

Another object of the present invention is to provide multiple access layers or levels to an information product depending on the type of content, user interest, selection, age, demographics, security level or other criteria.

Another object of the present invention is to facilitate protection of intellectual property distributed in an electronic format through a variety of distribution mediums, devices or networks including a multi-node distributed computer network such as the Internet.

Another object of the present invention is to balance the conflicting aspects of—ease of accessibility for preview, by the user, for a purchase determination of given electronic content; and the need of the owners and distributors of information products for protecting and guarding against illegal duplication/proliferation of the same.

According to one of the embodiments of the present invention, these objects are met by superposing a masking layer on an original information product, which reduces its utility. Accordingly, when a consumer retrieves electronic content for making a decision about purchasing an information product, the consumer encounters a masked version of the for-sale information product which, provides substantial preview access to the original information product albeit in a fashion which deters the user from deriving full utility, education, enjoyment or entertainment from it. By providing preview access to digital data in a lower utility configuration, the distributor preserves the commercial value of the original information product while providing the consumer with decision-enabling content at the same time. The masking layer characteristics are relevant to the type of electronic content—text, audio, video, or a combination thereof—being masked. The masking effect itself can be tangible or intangible, it may contain textual data or audio or video signals that are superposed over the for-sale electronic content. It may be static or dynamic.

Thus, the information product is rendered in a reduced-utility configuration, for previewing, by applying a mask or masking effect that interferes with the original configuration of the information product. The purpose of representing the information product in a reduced-utility configuration is to allow a preview of the electronic work for making a purchase decision; while the original information product in its full-utility configuration, is released upon receipt of payment or upon completion of a qualifying action by a potential customer. The qualifying action may include paying through a credit card or a debit card, supplying a password for a pre-established account with the content provider, providing a gift certificate, or a token or a promotion code, or completing any other authorizing transaction established by the content provider.

In one specific embodiment of the invention the masking effect is in the form of a plurality of overlays that are displayed at various locations of the information product during its recreation or playback. The overlays are adapted to either static or dynamic. The overlays can themselves be mini-information objects carrying electronic content in the form of written text, drawings, images, animation, audio-visual content etc.

In another embodiment of the invention the masking effect is in the form of a "noise signal" or an interruptive waveform that is applied to audio or video content portions of the information product. The interruptive waveform can be continuous so that it appears throughout the playback of the information product or it may be discontinuous and appearing only at pre-selected intervals for pre-selected durations with specific frequency.

In still another embodiment of the invention the masking effect is in the form of a perceptible interference wave that traverses through a portion of the display screen during recreation of an information product.

In a further embodiment of the invention the masking effect is in the form of a blurring effect that is randomly, arbitrarily, or selectively applied to the various portions of the information product.

In another embodiment of the invention the masked version of an information product obtained by superposing a masking effect is rendered the default version of the information product. The information product persists in its masked state until a mask-removal procedure is carried out on the information product. After playback or display the information product reverts to its default masked state and re-access to the information product again requires an authentication or approval by the distributor.

According to another embodiment of the invention, there is provided a stealth information product for organizing and delivering information in a secure manner; said stealth information product comprising at least one encrypted sensitive content segment and at least one unencrypted content segment; wherein said unencrypted content segment is adapted for digitally masking said encrypted sensitive content segment and offering the semblance of a complete and innocuous information product; and, wherein access to said encrypted sensitive content segment requires firstly, satisfactory completion of at least one unmasking procedure and secondly, satisfactory completion of at least one decrypting procedure. Thus, the unencrypted content segment offers the appearance of a seemingly innocuous and camouflaging mask or masking effect that is superposed over the encrypted sensitive content segment. This provides redundant protection to the encrypted sensitive content segment and reduces the risk of potential tampering.

In a further embodiment of the invention an innocent document mask or masking effect is superposed on an intended document and wherein the intended document carries encrypted content and the encryption key is different from the unmasking code or key.

Further objects and advantages of this invention will become apparent from a consideration of the accompanying drawings and ensuing description.

BRIEF DESCRIPTION OF THE DRAWINGS

FIG. 6a shows the status of constituent layers of a 2-layer digital work in its original unmasked configuration.

FIG. 6b shows the status of constituent layers of the 2-layer digital work of FIG. 6a, in a reduced utility or masked configuration.

FIG. 6c shows the status of constituent layers of a 3-layer digital work in its original and unmasked configuration.

FIG. 6d shows the status of constituent layers of the 3-layer digital work of FIG. 6c, in a reduced utility or masked configuration.

FIG. 7a shows a multi-layer digital work and the status of its constituent layers in its original and unmasked configuration.

FIG. 7b shows the multi-layer digital work of FIG. 7a and the status of its constituent layers in a heavily masked configuration.

FIG. 7c shows the multi-layer digital work of FIG. 7a and the status of its constituent layers in a lightly masked configuration.

FIG. 8a shows a digital work along with its digital content components and the rendering protocol for original and unmasked configuration.

FIG. 8b shows the digital work of FIG. 8a along with its digital content components and the rendering protocol for reduced utility or masked configuration.

FIG. 9a shows a digital movie in its original and unmasked R rated configuration.

FIG. 9b shows the digital movie of FIG. 9a in a customized masked G rated configuration.

FIG. 9c shows the digital movie of FIG. 9a in a customized masked PG rated configuration.

FIG. 9d shows the digital movie of FIG. 9a in a customized masked PG-13 rated configuration.

FIG. 17a shows a Stealth Information Product in a masked configuration according to an embodiment of the invention.

FIG. 17b shows the Stealth Information Product of FIG. 17a in an unmasked encrypted configuration according to an embodiment of the invention FIG. 17c shows the Stealth Information Product of FIG. 17a in an unmasked decrypted configuration according to an embodiment of the invention.

DETAILED DESCRIPTION OF THE INVENTION

Figure 1A:
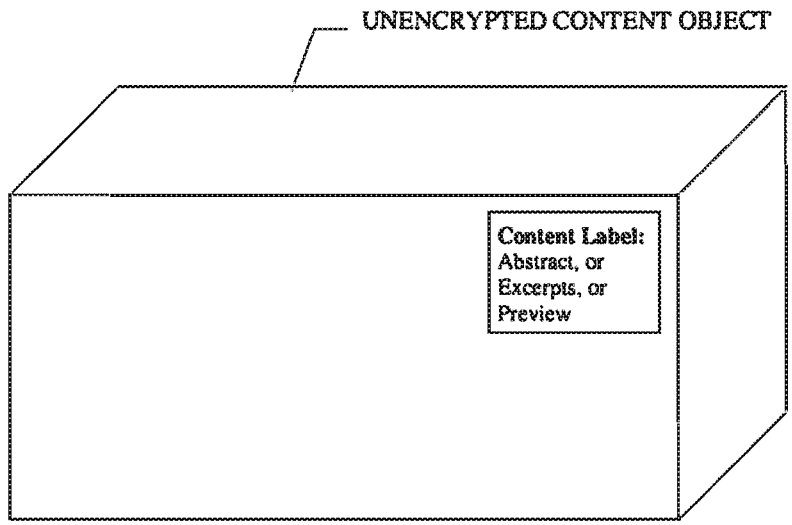
FIG. 1a is a conceptual representation of Prior Art showing the Unrestricted Access Information Distribution Model (Open Box Model).
Figure 1B:
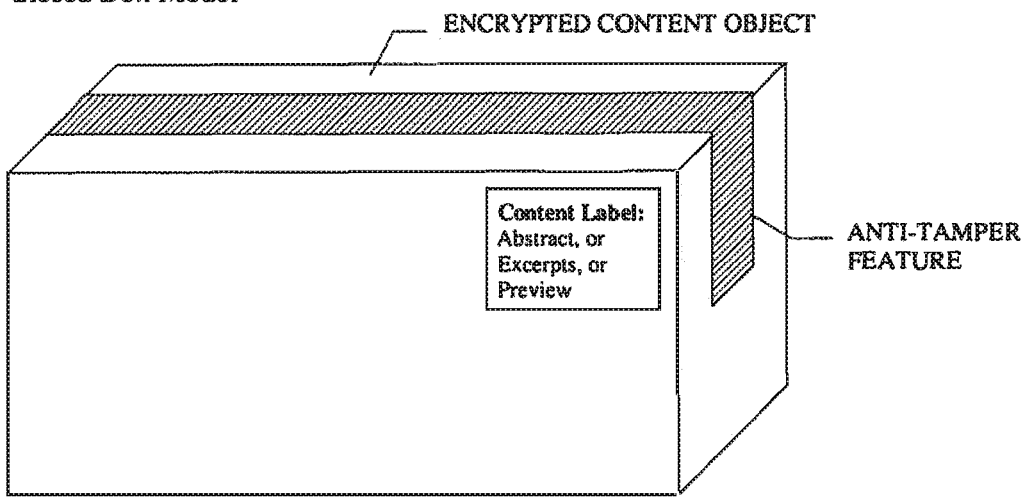
FIG. 1b is a conceptual representation of Prior Art showing the Restricted Access Information Distribution Model (Closed Box Model).

Terms, Definitions and Overview:

For a comprehensive discussion of the present invention it will be beneficial to define the various concepts, phrases and instrumentalities utilized in the present invention.

In the following description, various functional aspects of the present invention will be described. However, it will be apparent to those skilled in the art that the present invention has much broader field of application than the exemplary embodiments set forth hereinafter.

Specific examples of digital property distribution-chain configurations; masking effects used for re-representing digital content; and, electronic devices used for connecting, accessing, displaying, reading or playing back electronic content, information or products thereof are provided by way of illustration, in order to provide a thorough understanding of the present invention, and not by way of limitation.

The term "computer system" is used broadly as a device capable of processing, storing, accessing, and/or displaying information and includes a general purpose as well as special purpose data processing machines and computer systems, that are standalone, adjunct or embedded. The computer system may be programmable using various computer programming languages such as "C++", "Visual Basic" etc. or may be implemented using specially programmed hardware.

Information related terms, such as—data, data packets, files, programs, text, graphics, music, video, flags, bits, values, characters, strings, numbers—describing specific information types, products, representations or elements thereof are used in consistency with their common-use. It will be recognized by those skilled in the art that these data or information representations and other electronic content representations including superimposed masks and masking effects take the form of electrical, magnetic, or optical signals capable of being stored, accessed, copied, transferred, deleted, modified, combined, reproduced, captured, and/or otherwise manipulated through mechanical, electrical and operational components of a computer system.

Various operational elements of the system for distribution of Information and products thereof will be described in a particular order. However, the order of presentation is not necessarily the functional order for accomplishing the invention. All examples of commercial products and reference to them by their respective trade names is done for illustration and clarification purposes; it will be readily recognized by those of ordinary skill that these trade names are the property of their respective owners.

Terms such as—"Information", "Information Products", "Electronic Content", "Digital Content", and "Digital Works" refer broadly to all data that can be represented and transmitted electronically or digitally. A brief list of terms used for describing information and information products is shown in Table I. Table II shows a simple classification of various electronic content types, in context of this invention.

TABLE I

Terms Used For Describing Information Products

| Electronic Content | Digital Content | Information Products |
|---|---|---|
| Electronic Works | Digital Works | Multimedia Works |
| Electronic Publications | Digital Publications | Multimedia Content |
| Electronically Published Works | Digital Property | Information |
| Electronically Published Materials | Data | Information Object |

TABLE II

Classification of Information Products By Content Type

| Printable Matter | Books, E-Books, Magazines, Newspapers, Catalogs, Journals, Research Papers and other Published Materials; Generally, content containing - Alphabets, Letters, Words, Text, Images, Artwork, Figures, Drawings, Graphics, Photographs, Data, Formulas, Equations, Symbols, Spreadsheets, Tables, etc. |
|---|---|

TABLE II-continued

Classification of Information Products By Content Type

| | |
|---|---|
| Audio | Songs, Music, Audio Recordings, Speeches, Radio Programs, Audio Books, Messages; In general - Auditory Content. |
| Video | Movies, Films, Video Recordings, TV Programs, Entertainment, Dance, Animation, Games, Audio-visual Presentations etc. |
| Software and Related Data | Databases, Algorithms, Programs, Executable Applications, Software Templates, CAD Data, 3D Models and Geometry, Electronic Signals, Interactive Content etc. |
| Combinations of the Above | Multimedia Works, Cable, Satellite Transmissions, On-line Content, Digital Works Containing Heterogeneous Digital Elements Or Content Types; |

Strictly speaking an information product is an assembled package that contains information or electronic content. As listed in Table I and Table II herein above, information products or digital representations of Intellectual Property can take many forms and may include commercial or non-commercial electronic content including books, drawings, images, photographs, audio recordings, songs, music, video recordings, movies, software programs, animation, 3D geometry, multimedia works or interactive games. Also, the composition of an information product can be either homogeneous (consisting of a single data type) or heterogeneous (consisting of a plurality of data elements or content types). As will also be realized by those skilled in the art the information product can be any combination of binary data arranged or structured in a format dependent on data-type, size, content, compression level or other technical criteria.

Information products are typically recreated on a computer based-system. The term "recreation" or "rendering" of an information product used in this application refers broadly to "print, render, read, display, interpret or playback of an information product" using appropriate means or devices for such recreation or rendering. It will be readily understood by those skilled in the art that a recreation of printable matter requires a display device such as a monitor or a printer; however, the reading of a digital file requires a computer system and an interpretive program such as a word processor. Similarly, audio recordings, video recordings and multimedia works require specific hardware and read, interpret, display and/or playback devices for accessing and playing back the same.

"Superposing a mask or masking effect on an information product", or "applying a masking effect or mask on an information product" or simply "masking an information product"—refer to—applying a tangible or an intangible effect on an information product.

Superposition of a mask or masking effect on an information product creates a "reduced utility version" or "masked" version of the information product. Such a masking effect is referred to as a "utility-reducing masking effect". A "utility-reducing masking effect" limits the utility of the information product and renders the information product or at least a portion of the information product, being masked—incomplete, inconvenient, distorted, disrupted, and/or lacking information, data, features, functionality, resolution, clarity, text, graphics, images, audible content or video content.

"Reduced-utility configuration" or "reduced-utility representation" of an information product refers to its preview or masked state in which, the information product is characteristically represented in a fashion that disables its utilization to the fullest degree.

In generic terms, a "masking effect" generally interferes with the recreation of the information product in its "original and intended form." The "original and intended form" of an information product refers to the original, unmasked information product that was intended for distribution by its creators. The "original an intended form" of an information product may be either "clear text" or "cipher text."

A "Decoy Masking Effect" or "Decoy Content" is an innocuous appearing masking effect for masking the sensitive nature of mission critical documents as well as the underlying content. The underlying sensitive or mission critical content can be encrypted, in addition to being masked by an overlay of decoy content. Decoy masking effects or masks would find particular application in delivery of documents for critical missions where the risks and threats of interception, compromise and misuse are significantly higher.

Terms such as "Content Layering", "Mask Layering" or "Layered Masking" generally connote that masking effects have been imposed on an information product in the form of overlays or a plurality of layers. The net effect provided by plurality of layers may be accretive (content addition) or depletive (content hiding) or both—showing content as an overlay which hides the content in the layer below it.

The acronym ARCC, as used herein, stands for "As-Rendered Configuration Control" and refers generally to a scheme for managing digital content distribution by controlling rendering or exercising control over the as-rendered configuration of a digital work. The ARCC scheme is a more consumer-friendly and commerce-enabling method of providing access in a commercial context than the NPNA (no payment no access) type distribution schemes.

The acronym ARCCM, as used herein, stands for "As-Rendered Configuration Control by Masking" and refers generally to a scheme for managing digital content distribution wherein masking effects or masking layers are utilized for exercising control over the as-rendered configuration of a digital work.

The acronym CCRM, as used herein, stands for "Customized Controlled Rendering by Masking" and refers generally to a scheme for managing digital content distribution wherein masking effects or layers are utilized for exercising control over the as-rendered configuration of a digital work and wherein the as-rendered configuration is customizable for a plurality of customers or audience groups.

The acronym OCRM, as used herein, refers to "Owner Controlled Rendering by Masking" and refers generally to a scheme for managing commercial distribution of digital works by a content provider or distributor wherein the owner retains full control over the as-rendered configuration of a digital work.

System:

A method and a system for browsing, searching, previewing, selecting, downloading, retrieving, distributing, and selling digital content and enhancing the security thereof is disclosed.

Figure 2:
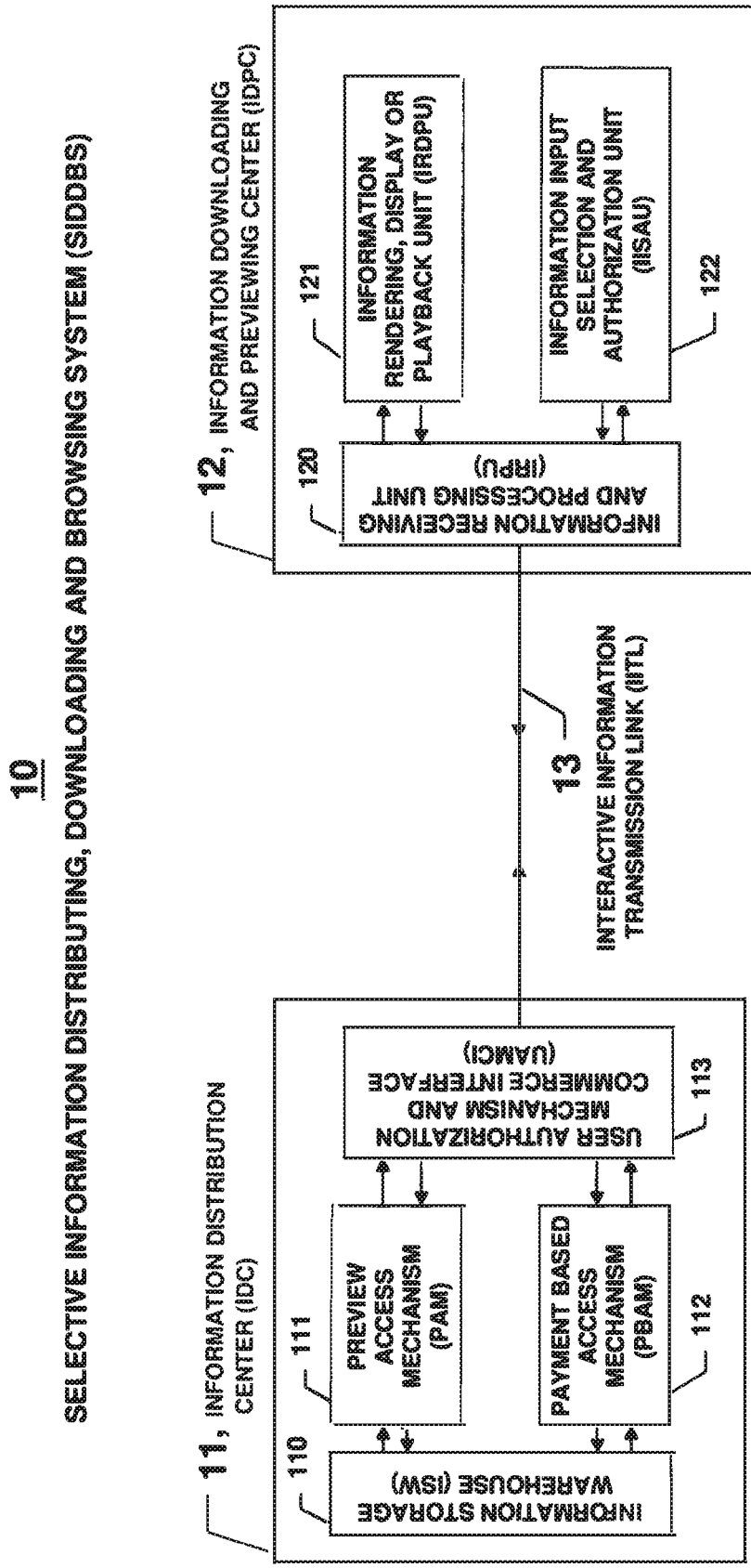
FIG. 2 is a block diagram illustrating the various elements of a Selective Information Distributing, Downloading and Browsing System (SIDDBS) in accordance with an embodiment of the invention.

FIG. 2 shows a Selective Information Distributing, Downloading and Browsing System (SIDDBS) 10, for distribution of information products or electronic content, in accordance with this invention. It will be recognized by those of ordinary skill that information products may be distributed by content creators, authors, musicians, movie directors, sports organizations, singers, paper publishing companies, recording companies, movie studios, TV studios, or other individuals and organizations. SIDDBS 10 has three basic elements comprising of—on the supplier side, an Information Distribution Center (IDC) 11; on the consumer side, an Information Downloading and Previewing Center (IDPC) 12; and an Interactive Information Transmission Link (IITL) 13 therebetween.

IDC 11 has several functions including storage, authentication, payment processing, access management and transmission of information products. These functions can be performed by a singular multi-functional computing device or a computer system. Alternately, the functionalities can be divided between a plurality of computing and storage devices or servers connected together in accordance with known network protocols.

The functions performed by IDC 11, include: (a) storing information products or electronic content provided by publishers and authors; (b) authenticating users per pre-established criteria including payment confirmation, membership status, and/or account history, etc.; (c) processing payments and customer purchase requests; managing access to information products per user privileges as different users and/or groups may have different privilege rights; (d) distributing information products in original or masked form in accordance with authentication and access rights. Thus, for instance a non-paying user will only receive a masked or reduced-utility version of an information product, while a paying user will receive the information product in its original and intended form.

The essential functionalities of IDC 11 are performed by logic processing sub-systems or units as shown in FIG. 2. Specifically, these sub-units include an Information Storage Warehouse (ISW) 110, which acts as an information storage facility or data bank; a Preview Access Mechanism (PAM) 111, for processing and distributing derived or masked information products; a Payment Based Access Mechanism (PBAM) 112, for processing and distributing information products in their original and intended form; and a User Authorization Mechanism and Commerce Interface (UAMCI) 113 for authorizing users, processing commerce transactions, and issuing permissions for distribution of information per pre-established criteria such as user-authorization status, account authentication, payment confirmation, digital signature, consumer consent or other qualifying actions established by the distributor.

As shown in FIG. 2 the connection between Information Distribution Center, IDC 11 and the Information Downloading and Previewing Center, IDPC 12 is through an Interactive Information Transmission Link, IITL 13. IITL 13 can be a link via the Internet or the World Wide Web or other communication network(s) including Cable, Telephone, DSL, ADSL, and Modem or Satellite links. Also, in FIG. 2, IDC 11 is shown connected or linked via IITL 13 to a single IDPC 12. It will be recognized by those skilled in the art that IDC 11 can be concurrently and independently connected to a multitude of users having their own Downloading and Preview devices via a variety of interactive communication links operating at various transmission or information-exchange speeds.

At the consumer end, the Information Downloading and Previewing Center, IDPC 12, is a typical computer system and may be a general-purpose computer, which is programmable using a programming language or may use specially programmed hardware. The IDPC 12 includes an Information Receiving and Processing Unit (IRPU) 120; an Information Rendering, Display, or Playback Unit (IRDPU) 121; and, an Information Input, Selection and Authorization Unit (IISAU) 122.

IRPU 120 is analogous to the central processor and memory devices of a Personal Computer (PC). On most commonly used PCs, commercial processors used include Pentium® and Celeron® processors supplied by Intel Corporation and Athlon® Processors supplied by AMD Corporation. Many other processors are also available. Such processors execute an operating system program such as Windows 95 or Windows 98 provided by Microsoft Corporation, or OS/2 provided by IBM Corporation, or other commercial operating systems. The communication functions are generally accomplished by a communication device such as a modem which provides the conduit or link to the world wide web (WWW) or the Internet or other private network(s).

IRDPU 121 is analogous to output devices may be connected to the computer system such as a Cathode Ray Tube (CRT) Display or monitor, Liquid Crystal Display (LCD) screen, Speakers or Audio outputs and Printers.

IISAU 122 is analogous to input devices on a PC. Examples of input devices include a keyboard, keypad, trackball, mouse, pen and tablet, barcode scanners, MICR scanners, OCR scanners, cameras and sensors. These input devices may be connected to the IRPU 120 via wire based interconnect system or through a wireless connection. It will be recognized that other cursor control and input systems such as voice activated command controls may be used in lieu of or in addition to the keyboard and mouse.

It will be readily realized by those skilled in the art that a PC may contain additional device such as auxiliary storage devices such as Zip disks, DVD disk drive, CD-ROM drive, scanners, cameras, attached to it.

The IDPC 12 has been described herein above as a general-purpose personal computer system having individual sub-components or units including Information Receiving and Processing Unit (IRPU 120), an Information Rendering, Display or Playback Unit (IRDPU 121), and, an Information Input, Selection and Authorization Unit (IISAU 122). It would be realized by those skilled in the art that IDPC 12 can be a special purpose computer system with the sub-components IRPU 120, IRDPU 121 and IISAU 122 corresponding to the processing, output and input modules of the system respectively.

A few examples of IDPCs and subcomponents IRPU, IRDPU and IISAU are shown in Table III. It is noteworthy that IDPC 12, does not necessarily need to be modular having the above identified sub-components; IDPC 12 can be an integrated device for receiving, ordering and rendering electronic content such as a portable hand-held device like the type sold under popular trade names Palm, Pocket PC, iPaq etc.

TABLE III

Examples of Information Downloading and Previewing Centers (IDPCs)

| System: IDPC | IRPU | IRDPU | IISAU |
|---|---|---|---|
| 1 Personal Computer System (PC) | CPU, Memory with upstream communication device such as a modem or DSL/ADSL link. | Monitors, Display, Speakers, Printers. | Keyboard, Mouse or other cursor control device such as voice activated software. |
| 2 Personal Digital Assistant (PDA) | Processing, display and input units are integrated into one device. | | |
| 3 Digital Video Disk System (DVD) | DVD Player | Television and Speaker system | Command button console or remote control |

TABLE III-continued

Examples of Information Downloading
and Previewing Centers (IDPCs)

| System: IDPC | IRPU | IRDPU | IISAU |
|---|---|---|---|
| 4 Cable TV | Cable Box or TV signal decoder with Coaxial cable link | Television and Speaker system | Command button console or remote control |

A special computer system might have pre-programmed command-button input choices presented on a command console or through a remote-control type command console. It should be understood that the invention is not limited to the particular input or output devices used in combination with the computer system or to those mentioned herein neither is this exemplary list meant to be exhaustive. In addition to input-output devices, the computer system architecture or operating system can be varied and may be implemented in a standalone, networked or embedded configurations.

Figure 3:
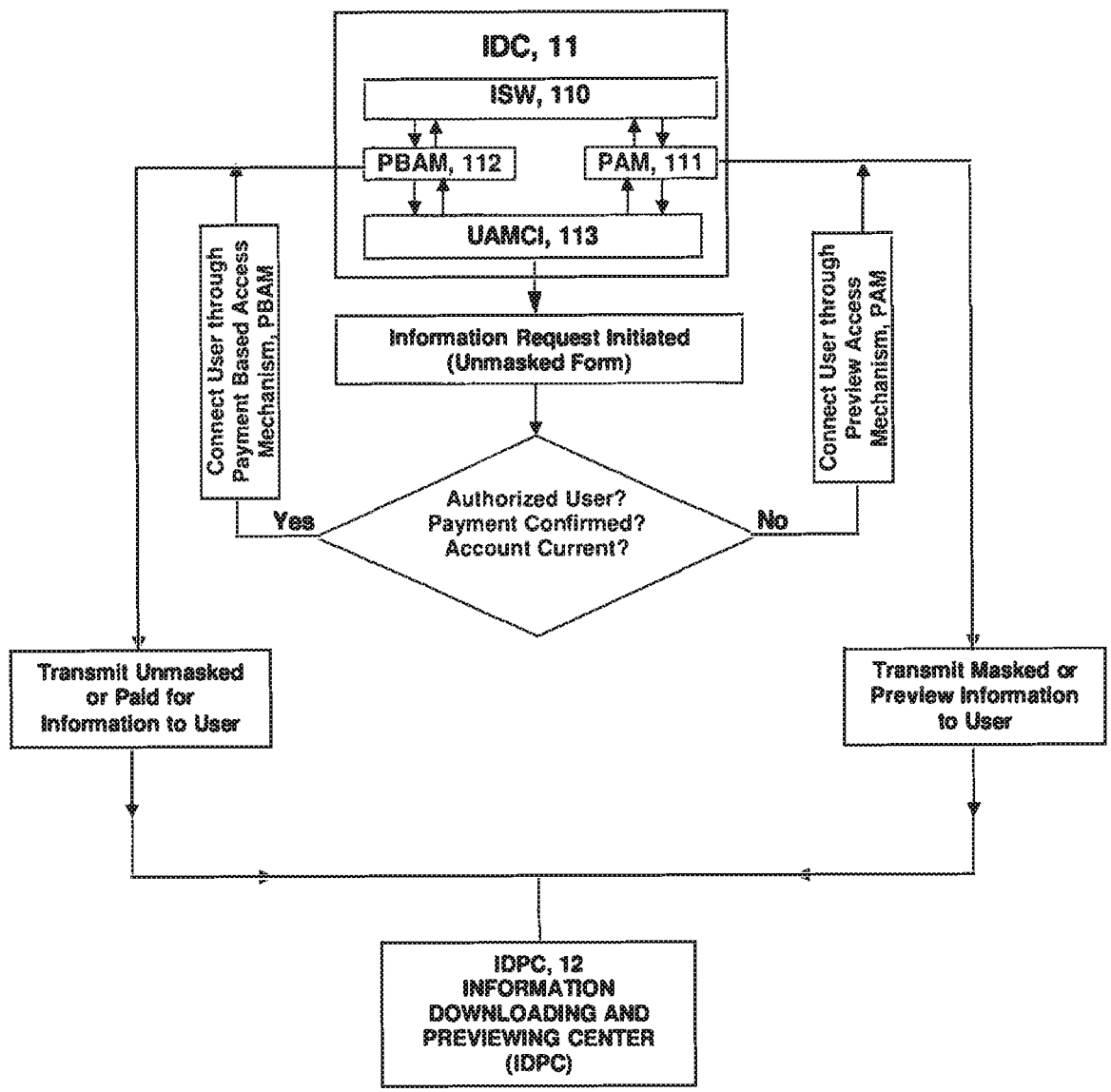
FIG. 3 is a flowchart illustrating the operation of SIDDBS in accordance with an embodiment of the invention.

Referring now to FIG. 3 there is shown, in a flow-chart format, a method for distributing, downloading and previewing information. Essentially FIG. 3 illustrates the basic operation of the present invention and interaction between the user and the distributor through a communication link established between their respective computer systems. For clarity and consistency like parts bear the same reference numerals as FIG. 2. Thus, the distributor's computer system is referred to as the IDC 11 (Information Distribution Center) while the customer's computer system is referred to as IDPC 12 (Information Downloading and Previewing Center).

As detailed hereinabove IDC 11 and IDPC 12 are connected through an interactive communication link IITL 13 (Interactive Information Transmission Link). The communication link itself can be wire based or wireless and utilize telephone, coaxial cable, fiber optics or satellite communication links or networks. It will be apparent to those skilled in the art, that a secure, reliable and trustworthy communication network link, channel or connection is required for effective distribution of digital content and Information Products. The present invention presupposes that such a secure and trusted communication link can be established between IDC 11 and IDPC 12.

The computer systems IDC 11 and IDPC 12 or components thereof are operable in requester and provider modes or functionalities. Thus, for instance, in the requester mode IDPC 12 will request access to a specific Information Product or digital work from the IDC 11; IDC 11, in the provider mode, will process the user's request and thereafter itself switch to the requester mode and request the user for a specified payment amount in exchange of value for the Information Product; IDPC 12 will now, in the provider mode, supply a credit card number for payment of the digital work and so on. This is frequently referred to as client/server architecture, in which, the client (personal computer or workstation) is the requesting machine and the server is the supplying machine, both of which are connected via a local area network (LAN) or wide area network (WAN). In other words, a client is defined as a requester of services and a server is defined as the provider of services. A single machine can be both a client and a server depending on the software configuration.

As listed in Table I and Table II herein above, information products or digital representations of Intellectual Property can take the form of books, graphics, images, music, audio, video, animation, 3D geometry, multimedia works or software. Also, the composition of an information product can be either homogeneous (consisting of a single data type) or heterogeneous (consisting of a plurality of data elements or content types). As will also be realized by those skilled in the art the information product can be any combination of binary data arranged or structured in a format dependent on data-type, size, content, compression level or other technical criteria.

Figure 4:
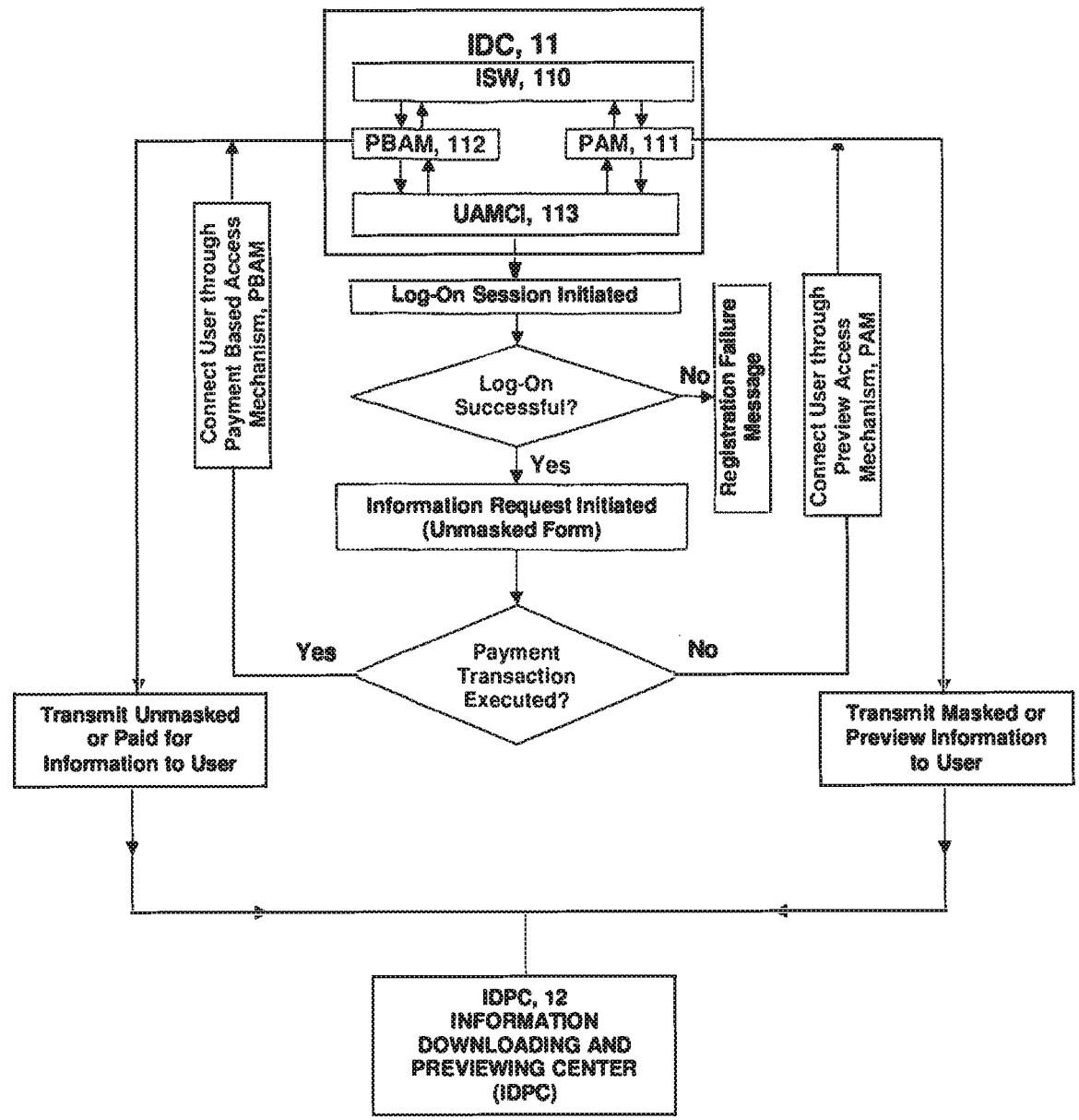
FIG. 4 is a flowchart illustrating the operation of SIDDBS in accordance with another illustrative embodiment of the invention.

All information or information products are stored in the Information Storage Warehouse, ISW 110 and are accessed from the ISW in a pre-controlled manner. ISW 110 can be regarded as the "information bank or "data bank." Exchange or distribution of information from ISW 110 occurs in accordance with the "exchange rate or value" assigned to a given "information product" and under specific guidelines or criteria established by the distributor. Exemplary criteria are shown in FIG. 3 and FIG. 4, wherein the customer can gain access to the original content stored in ISW 110 by paying for it through a Payment Based Access Mechanism, PBAM 112. Alternately, the customer can acquire content from ISW 110 using a Preview Access Mechanism, PAM 111. PAM 111 ensures that the customer receives the original content from ISW 110 in a masked or reduced utility configuration for purchase decision purposes.

The Interactive Information Transmission Link IITL 13 is used to establish a connection with the User Authorization Mechanism and Commerce Interface, UAMCI 113. Once a successful link has been established with UAMCI 113, the user proceeds to request a specific information product or title from IDC 11. The commerce interface module of UAMCI 113 processes the information request in accordance with predetermined conditions that must be met for specific access type. Thus, UAMCI 113 acts as the gateway to the ISW 110. The functionalities of the UAMCI 113 may include processing information requests and payment transactions, generating billing information, confirming that the credit card information provided by the user is genuine by confirmation of billing address associated with a credit card number or other third party authentication mechanisms. Upon successful completion of the authorization step and confirmation of payment conditions, the user is provided access to the information product request through the Payment Based Access Mechanism, PBAM 112 and receives the original, paid-for version of the information or digital work requested.

In case of failure of the Payment transaction or the user's interest in a preview version of the requested information, the user is directed through Preview Access Mechanism, PAM 111 and receives a masked version of the information product.

It will be recognized by those skilled in the art, that the primary purpose of providing free access to information or products thereof in a "masked" or "reduced-utility" configuration is to NOT diminish or compromise its sale value. The level of "utility reduction" or "masking" for preserving the sale value of information or products thereof is dependent on:

(a) Type of information product (movie, music, book etc.)
(b) Selective superposition of masking effects on the various body elements of an information product; wherein, certain portions or regions of the information product or specific data elements in the information product are selectively masked or disabled for reading, display or playback.

(c) The composition of the digital content (text, graphics, photographs, audio and/or video).

FIG. 4 shows another embodiment of the distribution, downloading and previewing system. Once again, like parts bear like reference numerals. In this embodiment, the Interactive Information Transmission Link IITL 13 is used to establish a connection with the User Authorization Mechanism and Commerce Interface, UAMCI 113.

In the most generic terms, UAMCI 113 is the mechanism whereby the user interacts with the IDC 11 and invokes monetary transactions and gains access to Information or products thereof. At a minimum, the UAMCI 113 will process alpha numeric input provided by the user and provide transaction status feedback and then initiate access in accordance with the user's request for information and user's transaction status. The implementation and appearance of UAMCI 113 will vary according to the design and functionality preferred by the distributor.

A typical UAMCI may include various interactive facilities for various functions or user-approach conditions, which may be organized as interface modules. In the current illustrative embodiment the interface modules or facilities are:
(a) a Log-on facility (LF);
(b) a Registering Facility (RF)
(c) an Information Request and Selection Facility (IRSF);
(d) a Transaction Processing and Feedback Facility (TPFF);
In addition, UAMCI 113 will most likely be capable of storing, retrieving and checking against stored User Profiles, Log-on Information and Demographic Data.

The Log-on Facility may be the primary session initiation procedure that the user encounters for confirming his/her registration status. Session initiation procedures and requirements may be established by the distributor and implemented through the Log-on Facility in UAMCI 113. Session initiation procedure might have a registration pre-requisite, requiring the user to have a pre-assigned "USER ID" and "PASSWORD" or "Access Code".

If the USER ID and/or PASSWORD input is incorrect the user gets an error message and is directed to retrieving USER ID and PASSWORD data by alternate methods. If the user is not a registered user, the user is directed to the Registering Facility (RF). Once UAMCI 113 receives matching "USER ID" and "PASSWORD" information, the customer is cleared to proceed to the Information Request and Selection Facility (IRSF). The IRSF provides functionality for the user to search for Information and Information Products using the search and browsing functions. The content can be organized by Titles such as name of movies, books, audio albums and the like; by content type such as text, audio, video, software etc.; or by product type such as movies, books, music-audio, music video, news etc. Alternately, the user may input alphanumeric data for requesting a particular Information Product. Thus, the user has various options for choosing and selecting content to purchase or receive. The information request is initiated by the selection of an information product and receipt of a verifying signal from the user which may be a mouse-click on a command button or a key-board stroke or an audio-command.

Next the user is sent to the Transaction Processing and Feedback Facility (TPFF) where the user chooses a variety of payment options or a non-payment option. The user may choose one of his/her preferred method of paying and input the required credit card, bank a/c or other data depending on the payment option selected. Upon clearance of funds and receipt of payment, the user is notified and allowed the option of printing a record of the transaction. Thereafter, the user is cleared to proceed to Payment Based Access Mechanism whereby the user downloads the item(s) purchased.

A non-payment Information Request diverts the user to the Preview Access Mechanism PAM 111 and the user is allowed to download a masked version (reduced-utility version) of the items selected free of charge.

It will be realized that having a masked version for free and uncompensated distribution purposes relieves IDC 11 of payment processing and monetary transactions for delivery of masked or reduced-utility electronic content and a simplified version of IDC 11 can be set-up for delivering only masked content while Payment Based Transactions can be assigned to a separate computer system or distribution unit.

Also, in addition to the free and uncompensated primary distribution of masked content from one Information Distribution Center (IDC), the publisher(s) or distributor(s) may choose to allow unrestricted secondary distribution of the masked content between users, secondary distributors and other content providers (while retaining rights for authentication, selling and unmasking of electronic content). This limits the load on the IDC for Information requests as the same digital work or content can be accessed and downloaded in a masked configuration from a variety of content providers. This is a considerable advantage, as those skilled in the art would realize that the speed of accessing or downloading content (bits downloaded per unit time) is inversely proportional to the number of users requesting access and the information carrying capacity of the link. Thus, if all downloaded requests are routed through a single unit, downloads will be lot slower compared to routing them through multiple connection points.

Masking Effects:

A mask or masking effect can be applied or superposed on an information product for the purposes of providing—either a preview of the original content albeit in a reduced utility format; or for enabling a consumer to make a purchase decision regarding the original content; or for veiling the original content for providing additional protection; or for concealing or hiding of the original content including its context or nature; or for misinforming unauthorized recipients regarding original content or camouflaging the original and intended content.

The type, nature, placement and removal of the mask or masking effect can be tailored in accordance with the type, nature, value, importance and purpose of the original content. Masking effects can be seen and/or heard by a user during recreation of an information product, which has a masking effect superposed thereupon. Masking effects are adapted to cause at least one of the following when superposed on an information product—an interruption, a discontinuity, an interference, a distortion, a disorientation and/or a combination thereof. Additionally, masking effects can be superposed in the form of an overlay, an overlay window, a screen, a veil, a masquerade, a noise signal and/or a combination thereof. Masking effects can be adapted to be static or stationary and attached to at least a specific portion of the information product. Masking effects can also be dynamic wherein they are not necessarily attached to a specific portion of the information product but are adapted to appear with random or specific frequency. Masking effects can also adapted to be interference waveforms or noise signals. A masking effect or "a mask" may itself contain electronic content including audio content, video content, written text, pictures, graphics and/or commercial messages which either merges with, overwrites, suppresses, conceals or modifies the information product or portions thereof.

A utility-reducing masking effect can be adapted to be removable or reversible when a customer meets the prescribed criteria for gaining access to the information product in its original and intended form. Prescribed criteria may include a purchase of the information product or buying a subscription or being an authorized customer of the distributor. Once a customer meets the prescribed or pre-established criteria, access can be granted to the customer.

Alternately, a utility-reducing masking effect can be permanently superposed on an information product to create an irreversible masked version of the information product. Once a masked or preview version is created, the preview version can be freely distributed to a large audience for marketing and offering for sale the original information product.

Representing electronic content in a reduced-utility masked configuration directly yields the advantage of freely available content for purchase evaluation purposes from multiple access locations and sources without relinquishment of control by the original source, for purchase or authorized and unmasked rendering of Information and products thereof.

A commercial application for superposing a masking effect or a mask on an information product is for distribution control purposes. The masked version of the information product provides a preview of the original and intended information product albeit in a form that detracts from wholesome utilization or enjoyment of the information product. Thus, the masked version or a preview version remains substantially representative of the original information product and enables a user in evaluating the information product for making a purchase decision.

In a typical distribution scheme the distributor of an information product controls the superposition or application of the masking effect. The characteristics of the masking effect including the level, type, content and extent of masking are controllable by the distributor. A distributor of an information product can prescribe criteria for controlling the permanence, absence, removal or duration of the masking effect on the information product.

Referring now to FIG. 5a through FIG. 5f, there is shown a representative information product 50 in various unmasked and masked configurations wherein like reference numerals represent like parts.

It will be recognized by persons skilled in the art, that information product 50 will typically be in the format of a file or a similar logical entity which is capable of being recreated, accessed, called, read, displayed or played-back through an interpretive software program, installed on suitable hardware, and will be displayed through standard computer peripheral display and playback devices, such as, a monitor and speakers. For the purposes of this discussion, information product 50 can be assumed to be stored on a remote computer server and being accessed via a network connection. It will be readily recognized that it may as readily be stored locally or on a CD-ROM or similar storage media.

Figure 5A:
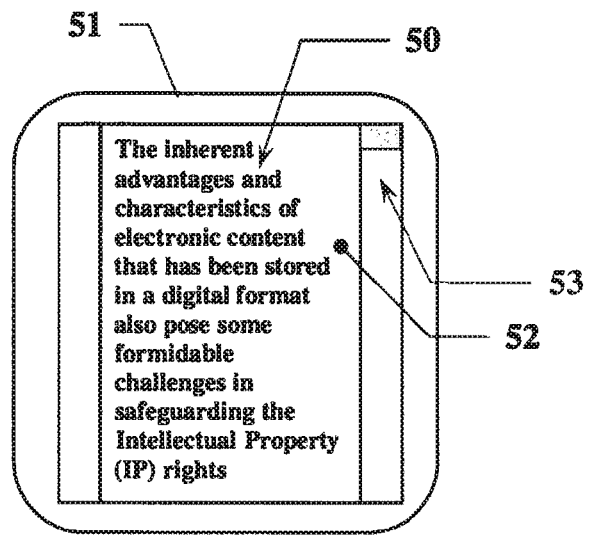
FIG. 5a illustrates an information product in its original and unmasked configuration.

FIG. 5a shows information product 50 being displayed on a display peripheral 51 in its unmasked, original and intended form. The display peripheral 51 has a screen 52 where the actual electronic content is displayed. Screen 52 is essentially an electronic content display window. It will be readily apparent that the display peripheral 51 can be a monitor, a CRT terminal or similar display device and may in addition be equipped with speakers or other voice output devices. The display peripheral 51 is connected to a suitable computing device or computer that has the ability of storing, processing and displaying information product 50. Although, as displayed information product 50 contain written text, it would be recognized that the representative data elements making up information product 50 can be characters, strings, arrays, text, graphics, video or any other data form. Various areas of the information product 50 can be accessed and displayed on the screen 52 by using the scroll bar 53.

In FIG. 5a, the information product 50 is shown in the original and intended form and in its full-utility or unmasked configuration. The content as shown in FIG. 5a, is the intended content that the user will receive or connect-to upon payment of due consideration. The means for exchanging payments and conducting money/financial transactions electronically over a secure network environment are well know in the art and are commonly encountered at various websites accessible throughout the World Wide Web or the Internet. Such websites, which accept credit cards and other payment means, are frequently referred to as e-commerce enabled websites.

FIG. 5b through FIG. 5f show illustrative examples of various masks or masking effects, which are superposed over original information product 50 to render same in reduced utility configuration(s). These illustrative masks interfere generally with the exhibition, display, printing, and/or playback of the information product 50 that appears on the screen 52.

Figure 5B:
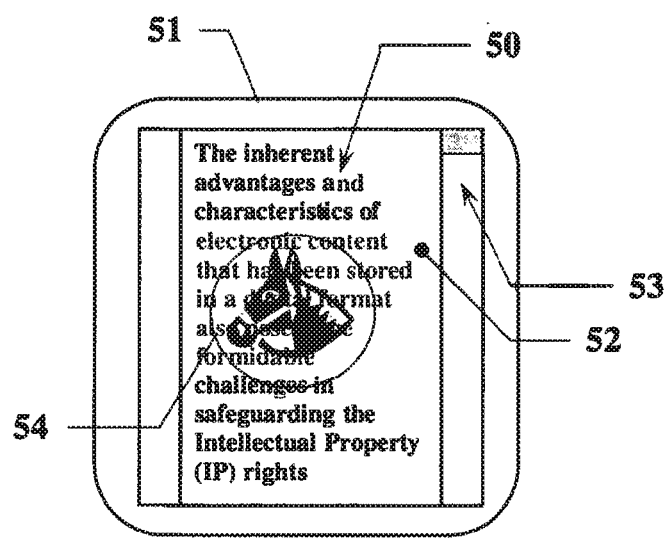
FIGS. 5b through 5f are examples of information products shown in masked or reduced utility configurations with various mask variants.

In FIG. 5b, information product 50 is shown in a masked configuration carrying a mask 54. Mask 54 is superposed over the displayed portion of the information product 50 on screen 52. Mask 54 acts as a masking overlay and partially hides a portion of the information product 50 that is displayed on screen 52. As shown in FIG. 5b, Mask 54 is opaque, has a sharply defined boundary and shows a graphic centrally located within the boundary. Mask 54 may be superposed on the information product 50 in a stationary manner and generally masking a pre-determined area or display region of screen 52. Alternatively, Mask 54 can be devised to be dynamic and in constant motion throughout the various areas of display screen 52 on which the electronic content is displayed.

Figure 5C:
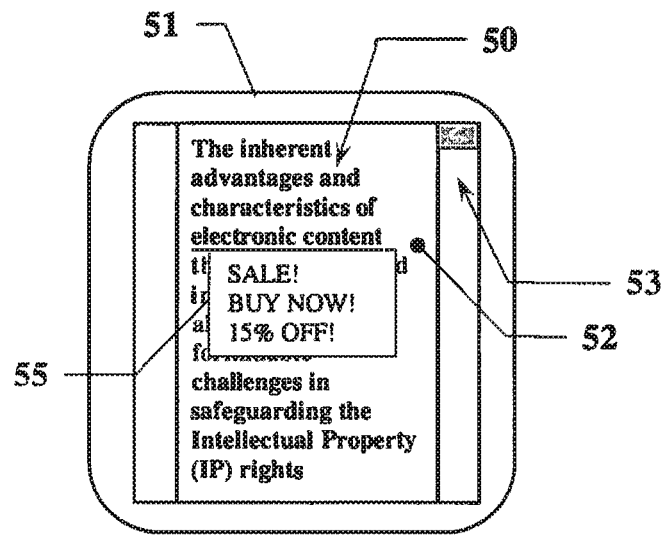

In FIG. 5c, information product 50 is shown in a masked configuration carrying a "content overlay" or mask 55. Mask 55 is superposed on the displayed region of information product 50 and also displays additional electronic content. The electronic content displayed by mask 55 may be either related to or completely unrelated to the information product 50. Thus, for example the mask 55 can contain marketing information about information product 50, which touts for e.g. the bestseller status of the document, or reviews by other readers, or information about the author, editor or publisher. Other examples of meaningful marketing content would be an HTML link to the order page for rapid access to the purchase page should the user decide to purchase information product 50 at any given time while reviewing a masked version of information product 50. The mask could also contain very targeted advertising or commercial material that relates directly to the underlying content, for example information product 50 might be available in various multimedia formats, which can be purchased in an integrated or separate manner at user's option. Thus, all the peripheral buying decision information can be made available through a content mask. In the above examples, the content mask acquires a dual functionality of masking information product 50 while at the same time providing information about the document and its purchase to the user.

Figure 5D:
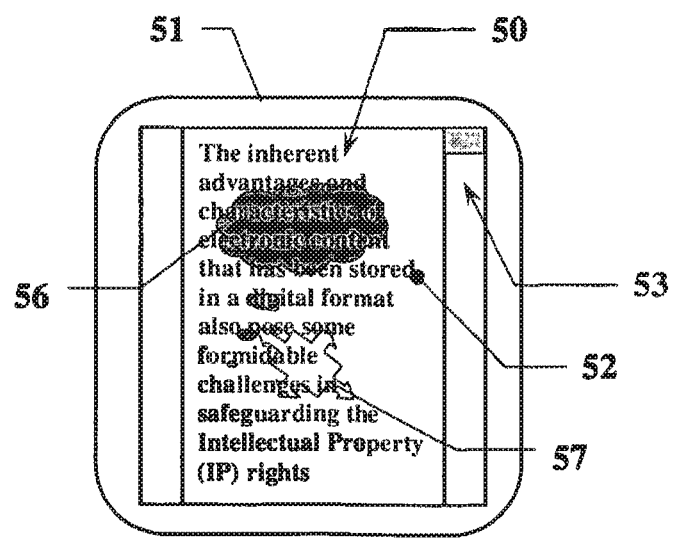

In FIG. 5d a plurality of masking elements are employed for masking information product 50. Specifically, masking elements 56 and 57 are shown disposed at separate locations on screen 52. Masking elements can have varying characteristics, whereas mask 56 is shown as a semi-transparent mask, and mask 57 is shown as opaque.

Figure 5E:
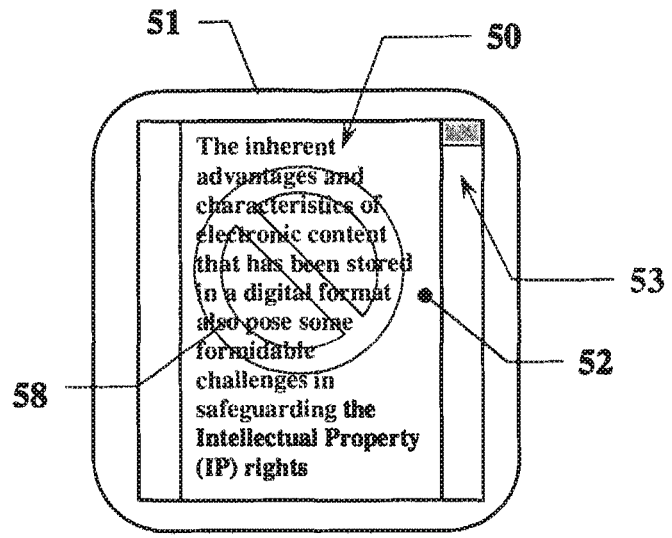

In FIG. 5e there is shown a masking element or mask 58 superposed over information product 50. Mask 58 is characterized by alternating opaque and semi-transparent regions.

Figure 5F:
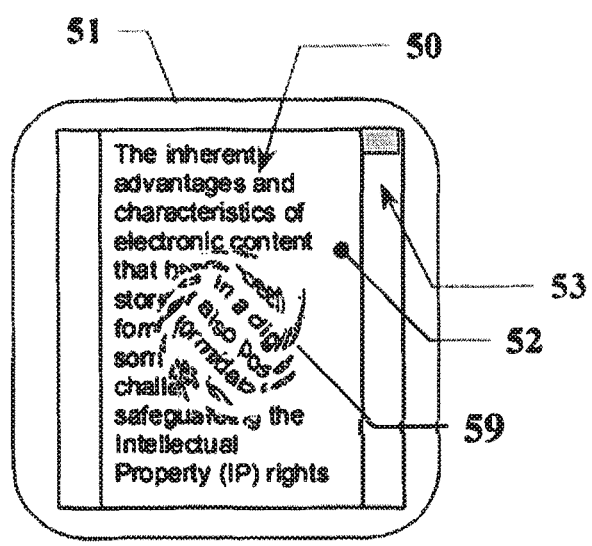

In FIG. 5f there is shown a masking effect 59, which distorts the displayed information product 50 at certain region(s) of screen 52. Alternately masking effect 59 can be rendered as a waveform wherein a content-distorting wave or ripple propagates through the displayed content on screen 52 at a certain frequency. Again, the purpose of distorting-waveforms is to interfere with the wholesome enjoyment of information product 50.

From the above it is readily seen that a variety of embodiments and distribution control schemes can be devised by utilizing masking effects for controlling distribution. In general, masks or masking effects are applied or superposed over an information product and adapted to cause an interference, interruption, distortion, discontinuity, disorientation, blurring, screening, veiling and/or hiding of at least a portion of the displayed electronic content. Masking effects are superposed for providing a preview of the underlying original content but in manner that only suffices for purchase-evaluation purposes and detracts from the wholesome utilization or enjoyment of the digital content. Masks or masking effects reduce the utility of the original electronic content and yet allow the user to make a purchase decision. The masking effect is readily removed or removable once the customer has met the pre-determined criteria or conditions for access and/or purchase of the content.

Alternately, the masking effects can be applied in a permanent manner to derive a masked information product. The masked information product can be used for marketing and generating sales for the original information product. The masked information product can be distributed in an unrestricted manner and made readily accessible.

The presence, absence, permanence or duration of application for a masking effect is controllable in accordance with the outcome of interactions between the distributor and the receiver. In one embodiment of the invention the removal of a superposed masking effect requires purchase of an information product. In another embodiment of the invention the masking effect can be turned permanent when tampering with the masking effect is detected.

The level, extent or degree of masking can be controlled by the distributor. In one embodiment of the invention the masking effect is in the form of a plurality of masking layers which can be switched ON of OFF to provide light or heavy masking.

According to another embodiment of the invention a plurality of masking effects may be separately superposed on a main information product to provide a plurality of masked information products. The plurality of masked information products is adapted for previewing by a plurality of audience group in accordance with their preview preferences. The superposition of a specific masking effect corresponding to a specific audience group renders a specific masked information product specifically targeted and tailored for that specific audience group for making a purchase decision. For instance, when considering purchase of movie potential buyers would be motivated to purchase based on their subjective content preferences such as action, comedy, drama, music and special effect etc. Tailoring a preview version for a specific audience group will result in more-informed decision by the potential buyer.

In one specific embodiment of the invention the masking effect is in the form of a plurality of overlays that are displayed at various locations of the information product during its recreation or playback. Overlays are essentially "perceptible masking objects" displayed over electronic content. Overlays can be in the form of continuous overlay or a plurality of overlay objects dispersed throughout the information product. The overlays are adapted to either static or dynamic. The overlays can themselves be mini-information objects carrying electronic content in the form of written text, drawings, images, animation, audio-visual content etc.

In another embodiment of the invention the masking effect is in the form of "interference," or "interruptive waveform," or "distortive waveform," or "noise signal," that is applied to the audio or video content portions of the information product. The interruptive waveform can be continuous so that it appears throughout the playback of the information product or it may be discontinuous and appearing only at pre-selected intervals for pre-selected durations. The frequency with which the interruptive waveform or pattern repeats itself on the information product, and the duration of the interruption period during which such interruptive waveform is present on the information product are variables that can be controlled by the distributor and adapted for a particular type of content.

Masking effects in the form of "interruptive or distortive waveforms" or "noise signals" that propagate through the displayed content at pre-determined frequency are particularly suitable for audio or video content and can appear at pre-selected intervals for pre-selected durations. Thus, the masking effect as an interruptive waveform can be also controlled chronologically during a playback of a movie, an audio recording, a video recording or a multi-media work. An interruptive waveform or interference can have an audio-interference component and a visual-interference component, which can be respectively superposed over audio and visual components of an information product.

In still another embodiment of the invention the masking effect is in form of a perceptible interference wave that traverses through a portion of the display screen during recreation of an information product. It will be recognized by those skilled in the art that masking effects can be general or selective. In other words the masks or masking effects may be displayed at an arbitrary region of the display window or terminal or they may be selectively attached to pre-determined portions of the electronic content. Masks are adapted to be stationary or dynamic. In other words, masks can cause interference at a specific stationary location relative to the displayed content or actually move around the display window.

Masks can have a variety of shapes and sizes having sharply defined or undefined boundaries. Masks can be white, colored, hued, opaque or transparent. Masks can have regions that have varying even opposing features, colors, opacity or behavior.

Masking effects or masks can also be included as mini-information objects superposed over the information product and containing electronic content in the form of text, images, graphics, photos, audio and/or video. Masks can serve additional functions by carrying/displaying additional content related to the original electronic content such as marketing information, purchase information, links to the order page, links to selected areas in the electronic content, special sale offers, very-targeted advertising media etc.

Masking effects can be in the form of micro-signatures that are added to the content to keep track of transmission history and record the transmission and distribution process and that gets updated every time a document is transferred, retrieved and transmitted from one computer system to another.

In another embodiment of the invention the masked version of an information product, obtained by superposing a masking effect, is rendered the default version of the information product. The information product persists in its masked state until a mask-removal procedure is carried out on the information product. The mask-removal procedure may require authentication or approval by the distributor prior to the recreation of the information product in its original and intended form. Once an authentication or mask-removal procedure has been successfully carried out the user can read, watch or listen to the information product but cannot store the information product in its original and intended form; thereafter the information product reverts to its default masked state and re-access to the information product again requires an authentication or approval by the distributor.

Content Layering:

As discussed above terms such as "content layering", "mask layering" or "layered masking", refer to masking effects that have been imposed on an information product in the form of overlays or a plurality of layers. Content layering finds particular application in controlling distribution and rendering by masking. Content layering is a technique for implementing, ARCCM or "As-Rendered Configuration Control by Masking".

Referring now to FIG. 6a and FIG. 6b there are shown diagrammatic representations of a 2-layer digital work 60, comprising a masking effect layer 601 and a digital content layer 602. FIG. 6a shows the digital work 60 in its unmasked configuration, wherein the masking effect layer 601 is turned OFF and the digital content layer 602 is turned ON. In the OFF state the masking effect layer 601 does not interfere with the digital content layer 602. Thus, when the masking effect layer 601 is turned OFF the digital work 60 is rendered in its original, intended and unmasked form.

FIG. 6b shows the 2-layer digital work 60 in its masked configuration. In the masked configuration both the masking effect layer 601 and the digital content layer 602 are turned ON. In its ON state the masking effect layer 601 superposes, distorts, veils, modifies, morphs or otherwise interferes with the rendering of the digital content on the digital content layer 602. Thus, when the masking effect layer 601 is turned ON the digital work 60 is rendered in a reduced utility or masked form.

Referring now to FIGS. 6c and 6d there are shown diagrammatic representations of a 3-layer digital work 61 comprising a masking effect layer 601; a digital content layer 602; and, a control layer 603. FIG. 6c shows the digital work 61 in its unmasked configuration, wherein the masking effect layer 601 is turned OFF; the digital content layer 602 is turned ON; and, the access to the control layer 603 is enabled. In the OFF state the masking effect layer 601 does not interfere with the digital content layer 602. The control layer 603 essentially controls the functionality and status of other constituent layers in the digital work. Enabling access to the control layer 603 permits the user to modify the status of the masking effect layer 601 and turn it ON or OFF in accordance with the rules established by the distributor. Typically, the access to the control layer 603 will be retained by the distributor or the creator of the digital work.

FIG. 6d shows the 3-layer digital work 61 in its masked configuration. In the masked configuration both the masking effect layer 601 and the digital content layer 602 are turned ON; and, the access to the control layer 603 is disabled. In its ON state the masking effect layer 601 superposes, distorts, veils, modifies, morphs or otherwise interferes with the rendering of the digital content on the digital content layer 602. Thus, when the masking effect layer 601 is turned ON the digital work 61 is rendered in a reduced utility or masked form. The control layer 603 may be controlled by the content creator or distributor or both. Disabling access to the control layer 603 ensures that the masking effect layer 601 cannot be turned OFF by the user and the digital work 61 can only be rendered in a masked or reduced utility configuration.

It will be recognized by those skilled in the art, that viewable digital content such as text, graphics, images and other printable matter can itself be organized into layers during creation of an information product. Commercial software currently available on the market such as Adobe Illustrator® sold by Adobe Systems Incorporated allows creation of graphic and other content into multiple layers. AutoCAD® sold by Autodesk, Inc. provides arrangement of design content in layers. However, existing software packages do not address masking overlays or masking layers that are utilized for controlling access or distribution of multi-layer content.

The organization of graphical and textual content into layers alone is not sufficient for controlling access and distribution of digital content. Distribution control with a masking layer essentially requires the ability to control the display status of the masking layer and built-in mechanisms to deter unauthorized reversal or removal of the masking effect. It will also be recognized by those skilled in the art, that FIGS. 6a-6d demonstrate the as-rendered status or configuration of the constituent layers of a digital work. A control interface similar to the representations depicted in FIGS. 6a-6d, can be used by the content creators to define and control the as-rendered configuration of the digital work.

In the context of the present invention the as-rendered configuration of the digital work is controllable by representing the digital work as a composite of multiple layers comprising at least one masking layer and at least one content layer; and, specifying and controlling the status (OFF or ON) of at least one of the constituent layers of the digital work. In addition, the display or as-rendered status of the digital work can be permanently set by the content creator or distributor. Thus, the owner retains the control over rendering of the digital work and this system can be referred to as "Owner Controlled Rendering by Masking" or OCRM.

It will be generally recognized that the specific control features or the level of control would largely depend on the type of content, length of content, fraction or percentage of the digital work represented on a particular layer, the sale value of the digital work, the commercial strategy of the content creator or distributor, and other qualitative, quantitative or competitive aspects of the digital work.

FIGS. 7a through 7c show diagrammatic representations of an exemplary embodiment of a multilayer digital work, 70 comprising a plurality of layers. Each individual constituent layer amongst the plurality of layers is adapted for carrying either a masking effect or the intended digital content. The individual layers can also be organized by a key characteristic such as the specific type of masking effect or the specific type of digital content. Specifically, there are three (3) masking layers—an audio-distortion masking layer 701; a video-distortion masking layer 702; and a content-overlay masking layer 703. The intended and original digital content is organized into seven (7) layers—a text headings layer 704; a main document body layer 705; a graphics layer 706; a photographs layer 707; an animated images layer 708; a audio/video clips layer 709, and a java objects layer 710.

It will be recognized that a variety of rendering configurations can be derived by selectively adjusting the status of the individual layer of the digital work 70. FIG. 7a shows the multilayer digital work 70 in its original and intended form wherein all of the masking effect layers 701, 702 and 703 have been turned OFF while all of the digital content layers 704 through 710 are turned ON.

It will be readily appreciated that organizing content into type-specific layer provides a great degree of flexibility in selectively adjusting the status of an individual layer to provide a great degree of masking and content rendering alternatives.

An exemplary masked configuration of the multilayer digital work 70 is shown in FIG. 7b and shows the as-rendered status of the various constituent layers. The masked configuration shown in FIG. 7b is termed—"heavily masked configuration" as several masking effect layers have been applied to the digital work to interfere with the rendering of the underlying digital content; in addition, specific content layers have been turned OFF and made unavailable. As shown in FIG. 7b all of the available masking effect layers—701, 702 and 703 have been turned ON and specific content layers 707 and 710 have been turned OFF.

Another exemplary masked configuration of the multilayer digital work 70 is shown in FIG. 7c. The masked configuration shown in FIG. 7c is termed—"lightly masked configuration" as two of the masking layers 701 and 703 have been turned OFF while all the content layers 704 through 710 have been turned ON. In FIG. 7c the masking effect is only provided by the video-distortion masking layer 702.

Other Methods for Implementing ARCCM:

In the embodiments described above particularly with respect to FIGS. 6a-6d and 7a-7c, ARCCM (As-Rendered Configuration Control by Masking) or OCRM (Owner Controlled Rendering by Masking) schemes have been described and functionally implemented by representing a digital work as a compilation of a plurality of layers. Further in the above discussion the term "masking effect" was delineated as being synonymous with a "masking layer." It will be generally recognized by those skilled in the art, that to implement ARCCM or OCRM it is not necessary to adopt a specific content architecture (or a particular content representation methodology) for utilizing the concept of masking effects and functionality thereof.

According to another embodiment of the invention, ARCCM (or OCRM) is implemented and exercised through a "rendering application". The rendering application is adapted for rendering a digital work in a pre-established rendering configuration. The as-rendered configuration of the digital work is controllable by the content creator or distributor to enable OCRM for commercial distribution of digital works.

The term "rendering application" refers to a software program or package or application suite that is designed to render—display, playback, read, decrypt, or interpret digital content. The rendering application interacts with computer hardware and renders or converts the stored digital file data into a form that can be used, displayed, heard or enjoyed by a person. The term rendering application is used broadly in the sense that it encompasses various software programs intended for web browsing, reading, text and graphics display, audio playback, video playback, interactive gaming, multimedia content manipulation etc. Examples of rendering applications include commercial web browsers and software programs such as Microsoft® Internet Explorer, Adobe® Acrobat®, Microsoft® Reader, Microsoft® Word, Windows Media™ Player, RealOne™ Player and QuickTime by Apple Corporation.

FIGS. 8a and 8b provide a logical demonstration of the rendering protocol for a digital work 80 in its unmasked and masked configurations respectively. The rendering protocol essentially defines the conditions for display or playback of the digital content along with the presence or absence of any masking effects, which might be imparted onto the original digital content for the purposes of controlling its as-rendered configuration.

As shown in FIGS. 8a and 8b, digital work 80 comprises a plurality of digital content components, namely, HTML pages 801; Images 802; Embedded Objects 803; Audio Content 804; Video Content 805; and Database Fields 806 and 807. A plurality of masking effects titled Masking Effect A, B and C and represented respectively by reference numerals 82, 84 and 86 are also provided for interaction with any of the digital content components.

The as-rendered configuration of the digital work 80 is controlled by specifying a rendering protocol through a "RENDERING PROTOCOL FACILITY." It will be recognized, that the Rendering Protocol facility may be a program, a sub-program, a function, a macro, an operation, a functionality or a sub-routine embedded within the rendering application for exercising control over the as-rendered configuration of the digital work in accordance with a specified rendering protocol.

Specifying the rendering protocol may be accomplished through a RENDERING PROTOCOL INTERFACE, which specifies the status of individual components or layers of a digital work. The Rendering Protocol Interface is essentially a graphical interface for defining the as-rendered version of the digital content, or components thereof, by—(a) selectively activating a specific digital content component of the digital work 80; and (b) selectively activating a specific masking effect that will be included in conjunction with a pre-selected digital content component. In the simplified abstractions, demonstrated in FIGS. 8a and 8b the rendering protocol for the as-rendered configuration is indicated by marking the array of square boxes next to the digital content components for activating the specific masking effect(s) for inclusion with said digital content component.

FIG. 8a shows the rendering protocol for the digital work 80 in its original and intended configuration. In the original and unmasked configuration, all the square boxes in the digital content column are activated (marked ON) signifying the availability of all the digital content components of the digital work 80. In addition, all the square boxes in the respective columns under Masking Effects A, B and C (82, 84 and 86) are left inactive or blank (marked OFF) signifying the exclusion of masking effects from the digital work 80. Thus, according to the representation shown in FIG. 8a digital work 80 would be rendered in its original and intended form without the interference of masking effects.

FIG. 8b shows the rendering protocol for the digital work 80, in an exemplary masked configuration. In the masked configuration, all the square boxes in the digital content column are still activated (marked ON) signifying the availability of all the digital content components of the digital work 80. However, in the masked configuration Masking Effects A, B and C (82, 84 and 86) have been selectively applied to the various digital content components, as represented by the checked-off (or activated or turned ON) square boxes under the corresponding Masking Effect column and the digital content row. As shown under the Masking Effect A column—Masking Effect A, 82 has been activated (marked ON) for HTML Pages 801; Images 802 and Video Content 805. As shown under the Masking Effect B column—Masking Effect B 84 has been activated (marked ON) for Audio Content 804. Similarly, as shown under the Masking Effect C column—Masking Effect C, 86 has been activated (marked ON) for Embedded Objects 803; Database Field 1, 806; and Database Field 2, 807.

Thus, by specifying a rendering protocol and activating specific digital content components and available masking effect(s), the as-rendered configuration of a digital work can be predefined by a content creator or distributor for implementing OCRM, (Owner Controlled Rendering by Masking).

The rendering protocol delineated in FIGS. 8a and 8b is exemplary only. A rendering protocol for a commercial digital work may, in addition, comprise of rendering conditions, display and playback permissions and other properties. A content distribution model may involve defining a "preview rendering protocol" and an "original rendering protocol" wherein the preview rendering protocol is the default configuration of the digital work; and, the original rendering protocol is protected by a code or a "masking key" which is supplied to the customer at the time of purchase.

Customized Controlled Rendering by Masking, (CCRM):

It will be generally recognized from the above that the "rendering protocol" for a digital work can be customized in accordance with the type of content, size of the digital work, diversity amongst audience groups etc. Digital content that can be customized by the user according to his or her needs, is desirable for several reasons, most importantly, it obviates the need for providing multiple versions of the same basic digital work and simplifies buying and selling. The concept of masking or applying masking effects for distribution control purposes offers a unique way of customizing content in accordance with the interests of the user. A particular embodiment, which illustrates customized controlled rendering of a digital work for a plurality of audience groups will now be described.

By way of illustration, when a DVD disc for a particular movie which, has been rated R, PG13, PG or G becomes available for public sale, the revenue for the DVD disc are affected by both its attractiveness to a particular audience class as well as demographics. It would be desirable that the same digital content can be customized and made suitable for watching by other audience groups.

FIGS. 9a through 9d show an exemplary embodiment of a CCRM (Customized Controlled Rendering by Masking) scheme for a digital movie 90 shown in various customized configuration including R rated form, G rated form, PG rated form and PG-13 rated form.

FIG. 9a shows the original R rated digital movie 90 in its original and unmasked configuration having at least one R rated scene sequence. In the exemplary embodiment digital movie 90 comprises a plurality of digital content components in the form of scene sequences represented by reference numerals 901, 902 . . . 907. A plurality of masking effects titled Masking Effect G1, G2, G3 and represented respectively by reference numerals 92, 94 and 96 are also provided for interaction with any of the digital content components or scene sequences, 901, 902 . . . 907. Masking Effect G1 is characterized by its ability to transmute the digital content in the scene sequences 901 to 907 to a "G" rating. Masking effect G2 is characterized by its ability to transmute the digital content in the scene sequence 901 to 907 to a "PG" rating. Masking effect G3 is characterized by its ability to transmute the digital content in the scene sequence 901 to 907 to a "PG-13" rating. The as-rendered configuration of the digital movie 90 is controlled by specifying the "rendering protocol" or the as-rendered status of the scene sequences 901 to 907. Thus, in FIG. 9a, which pertains to the original and unmasked configuration of the digital movie 90, the digital content components or scene sequences 901 to 907 are all activated as indicated by the checked boxes under the digital content column. Also, none of the masking effect check boxes are turned ON signifying that none of the masking effects has been applied.

FIG. 9b shows the original R rated digital movie 90 in a masked G rated configuration. The as-rendered configuration of the digital movie 90 in FIG. 9b shows that scene sequences 901 to 903 and 905 to 907 have been activated (marked ON) while scene sequence 904 has been turned OFF, illustrating the availability of all the scene sequences of the movie 90 except scene sequence 904. However, Masking Effect G1, 92 has been applied to scene sequences 902, 905, 906 and 907 for making the as-rendered configuration of movie 90 compliant with G rating requirements. Thus, the as-rendered G rated configuration of the movie 90 would be a masked configuration with a Masking Effect G1 applied to selected portions of the original movie.

FIG. 9c shows the original R rated digital movie 90 in a masked PG rated configuration. The as-rendered configuration of the digital movie 90 in FIG. 9c shows that scene sequences 901 to 907 have been activated (marked ON). However, Masking Effect G2, 94 has been applied to scene sequences 902, 904 and 905 for making the as-rendered configuration of movie 90 compliant with PG rating requirements. Thus, the as-rendered PG rated configuration of movie 90 would be a masked configuration with a Masking Effect G2 applied to selected portions of the original movie.

FIG. 9d shows the original R rated movie 90 in a masked PG-13 rated configuration. The as-rendered configuration of the digital movie 90 in FIG. 9d shows the scene sequences 901 to 907 have been activated (marked ON). However, Masking Effect G3, 96 has been applied to scene sequences 902 and 904 for making the as-rendered version of movie 90 compliant with PG-13 rating requirements. Thus, the as-rendered PG-13 rated configuration of movie 90 would be a masked configuration with a Masking Effect G3 applied to selected portion of the original movie.

Conceptually, in the exemplary embodiment described hereinabove, Masking Effects G1, G2 and G3 can be considered as discretionary filters blocking off access to certain violent or graphical content sequences in movie 90. However, it will be realized that the masking effects G1, G2 and G3 may have a more comprehensive functionality than mere filters. In addition to superposing, masking, and blocking off unsuitable content for a particular rating or audience, the masking effects can be further adapted for replacing with alternate content those sections of the original movie which carry objectionable or non-compliant content.

It will be further realized that the exemplary masking effects G1, G2, and G3 selectively employed with scene sequences 901-907 of movie 90 and described hereinabove in conjunction with FIGS. 9a-9d, can be utilized for other types of digital content and information products. Thus, for e.g. it would be beneficial to provide a technical, medical, professional, financial or educational information product in a given field of endeavor which can be selectively tailored for either a novice, an intermediate or an expert audience group. Tailoring the original content for certain audience groups also enables the content to reach a wider audience or circulation and enhances the utility of the information product.

Securing Digital Content by Masking:

As reviewed earlier prior art schemes commonly employed for securing digital content typically involve cryptographic mechanisms wherein digital content is stored and distributed in an encrypted format and later decrypted by an authorized user using a decrypting key. However, an inherent problem with cryptographically secured digital content package is that the level of protection, encryption or security measures employed—are directly proportional to the sensitivity of the information contained in the encrypted digital message. Thus, the relative importance of a particular information product or package is, at least identifiable if not misused, by parties having adverse interests to the authorized or intended entity or user(s). This might be of particular concern when delivering classified information relating to national security, military intelligence or war strategy or similar mission critical purposes.

It will be appreciated by those skilled in the art from the following description that masking techniques or masking effects can complement protection schemes based on encryption or cryptographic mechanisms.

Figure 10:
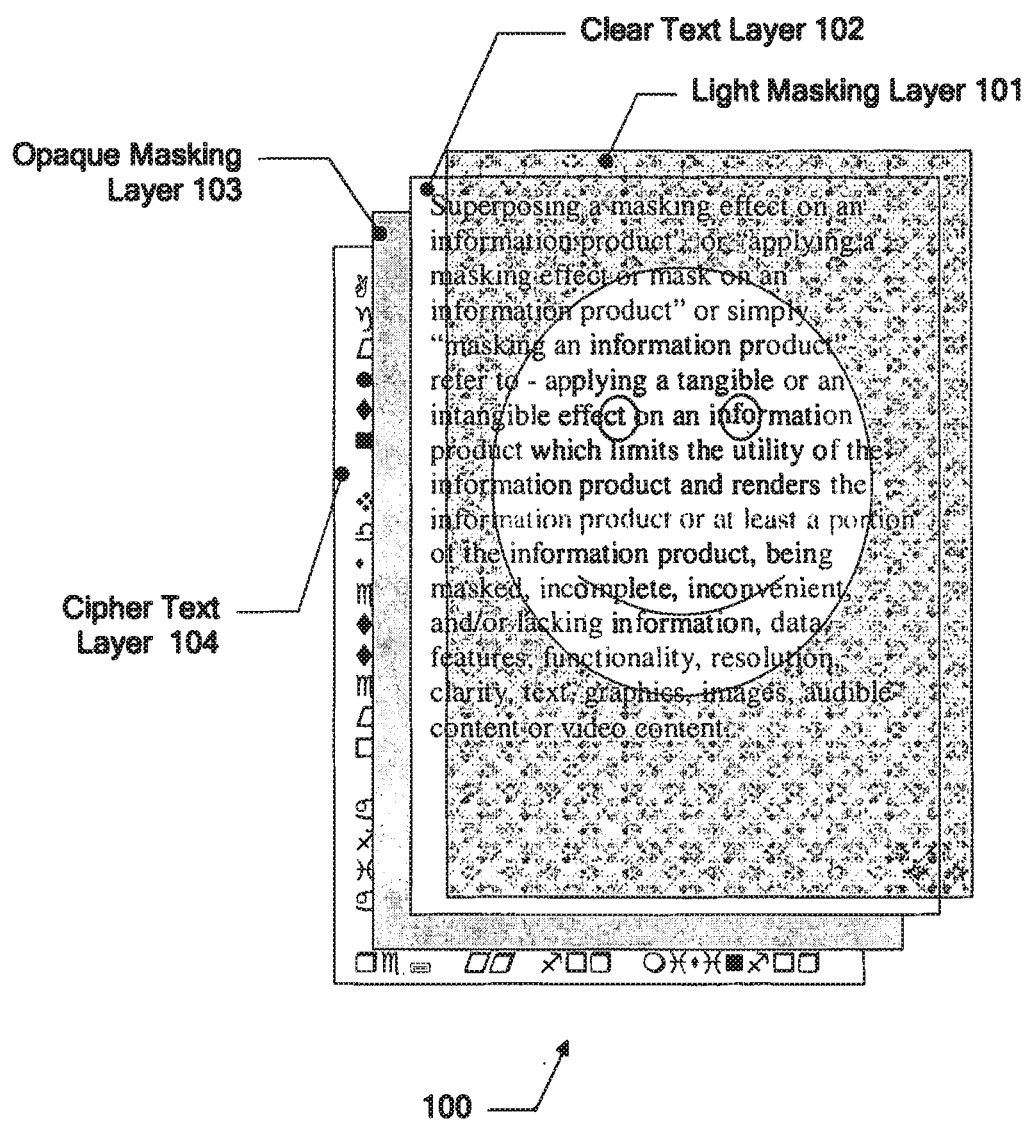
FIG. 10 is an illustrative representation of a digital work shown in a first masked configuration according to an embodiment of the present invention.

Referring now to FIG. 10 there is shown an exemplary multi-layer digital work 100. Although, digital work 100 is shown in a document format, it will be realized that digital work 100 is a generic representation for various content types discussed above. Digital work 100 comprises a plurality of masking effect layers and a plurality of content layers. The masking layers are represented by a Light Masking layer 101, and an Opaque Masking Layer 103. The content segments or layers are represented by a Clear Text Layer 102, and a Cipher Text Layer 104. The masking layers are superposed on the content layers to accomplish any of the objects of the invention described hereinabove. Light Masking Layer 101 is superposed on the Clear Text Layer 102. Opaque Masking Layer 103 is superposed on the Cipher Text Layer 104. It will also be realized by those skilled in the art, that the distinction between various masking layers is arbitrary. Thus, for instance a masking layer may have a visual property such as "transparency" and adjusting the value of this visual property can render a masking layer clear, semi-transparent or opaque. Furthermore, masking layers themselves can have visual objects or content associated with them.

FIG. 10 shows that the Light Masking Layer 101 is superposed on Clear Text Layer 102 and thereby interferes with the display of text content on Clear Text Layer 102. The digital work 100 with Clear Text Layer 102 in a masked configuration can be used by a content provider for preview purposes. Accessing the content on Layer 102 requires unmasking or removal of Masking Layer 101.

Figure 11:
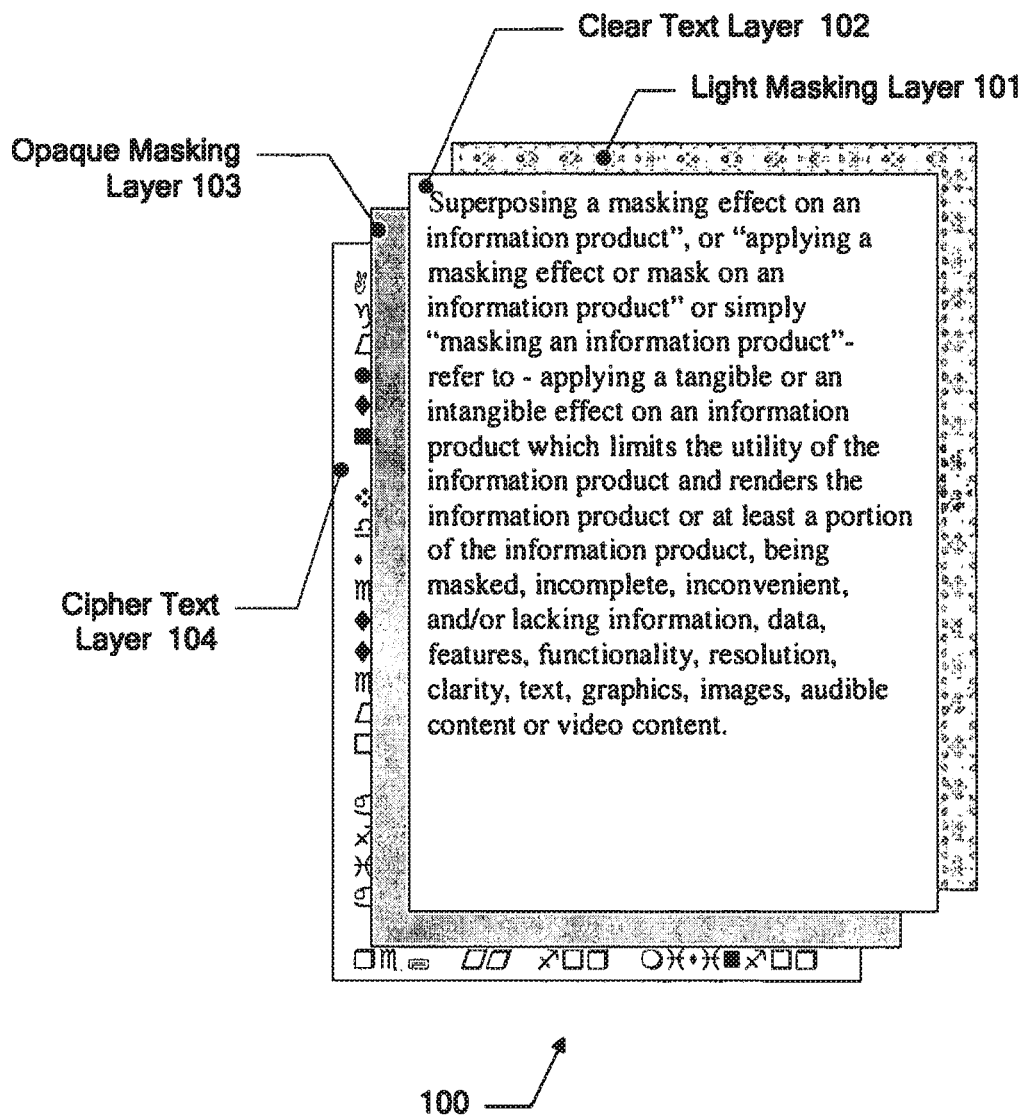
FIG. 11 is an illustrative representation of the digital work of FIG. 10, shown in a first unmasked configuration according to an embodiment of the present invention.

FIG. 11 shows the digital work 100 after the unmasking operation or removal of Light Masking Layer 101 has been completed. The Clear Text Layer 102 becomes unmasked and is presented in its original and intended form. Unmasking of the Clear Text Layer 102 by removing the Light Masking Layer 101, can be achieved by performing an "unmasking operation" which may require an "unmasking key or code." For most commercial applications the unmasking operation can be coupled with receipt of payment or similar transactional event prior to rendering Clear Text Layer 102 in an unmasked form.

Figure 12:
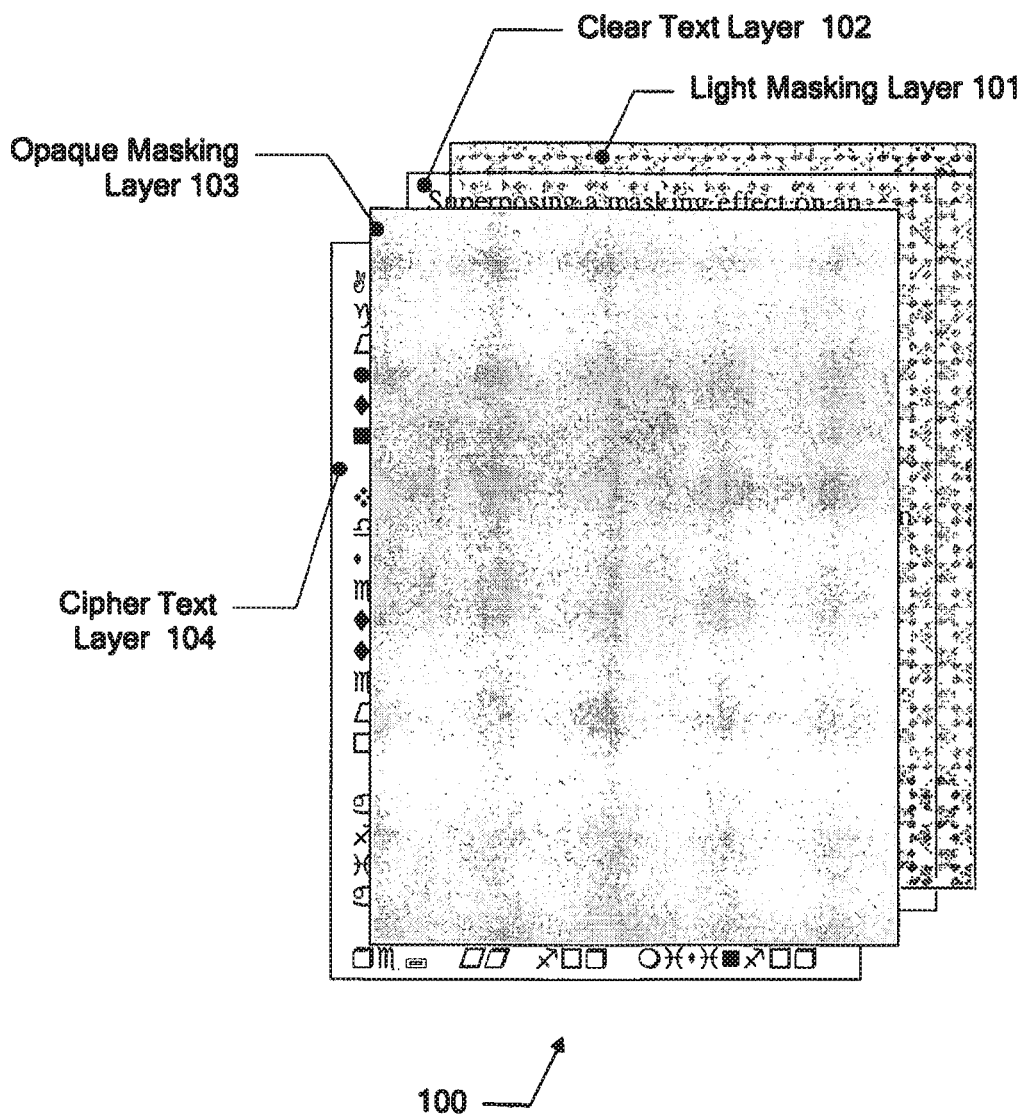
FIG. 12 is an illustrative representation of the digital work of FIG. 10, shown in a second masked configuration according to another embodiment of the present invention.

FIG. 12 shows an exemplary embodiment of the invention wherein access to a content layer, indicated by Cipher Text Layer 104, is completely prevented by an opaque masking effect, indicated by Opaque Masking Layer 103. The contents of the Cipher Text Layer are not accessible, in any form, until the Opaque Masking Layer 103 is removed or unmasked. Once again removal of Opaque Masking Layer 103 involves completion of an unmasking operation.

Figure 13:
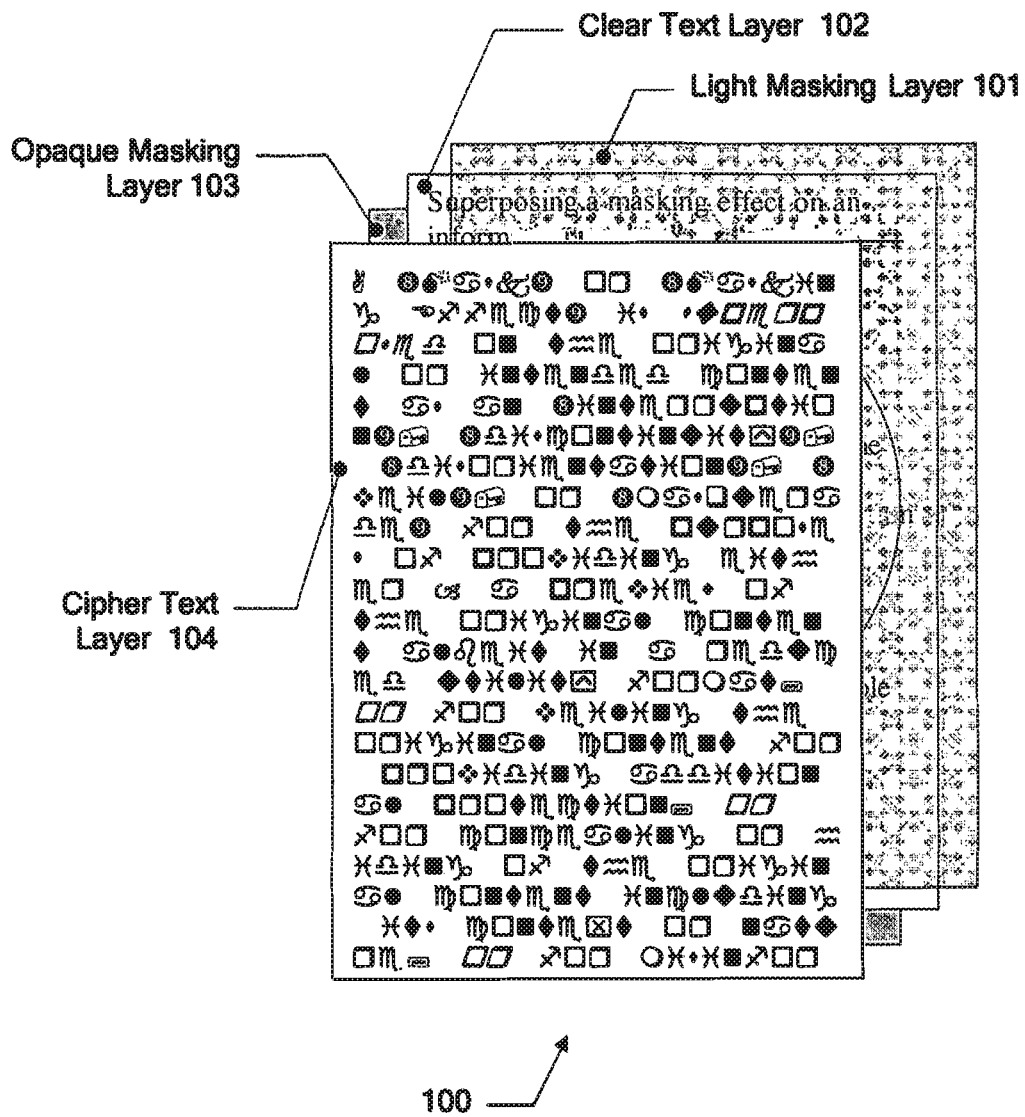
FIG. 13 is an illustrative representation of the digital work of FIG. 10, shown in a second unmasked encrypted configuration according to another aspect of the present invention.

FIG. 13 shows the digital work 100 after the unmasking of the Opaque Masking Layer 103. Removal of the Opaque Masking Layer 103 unveils the encrypted Cipher Text or encrypted format of the digital content. Once again the content is not usable because of its encrypted nature and has to undergo a decrypting operation prior to obtaining it in a coherent and meaningful form.

Figure 14:
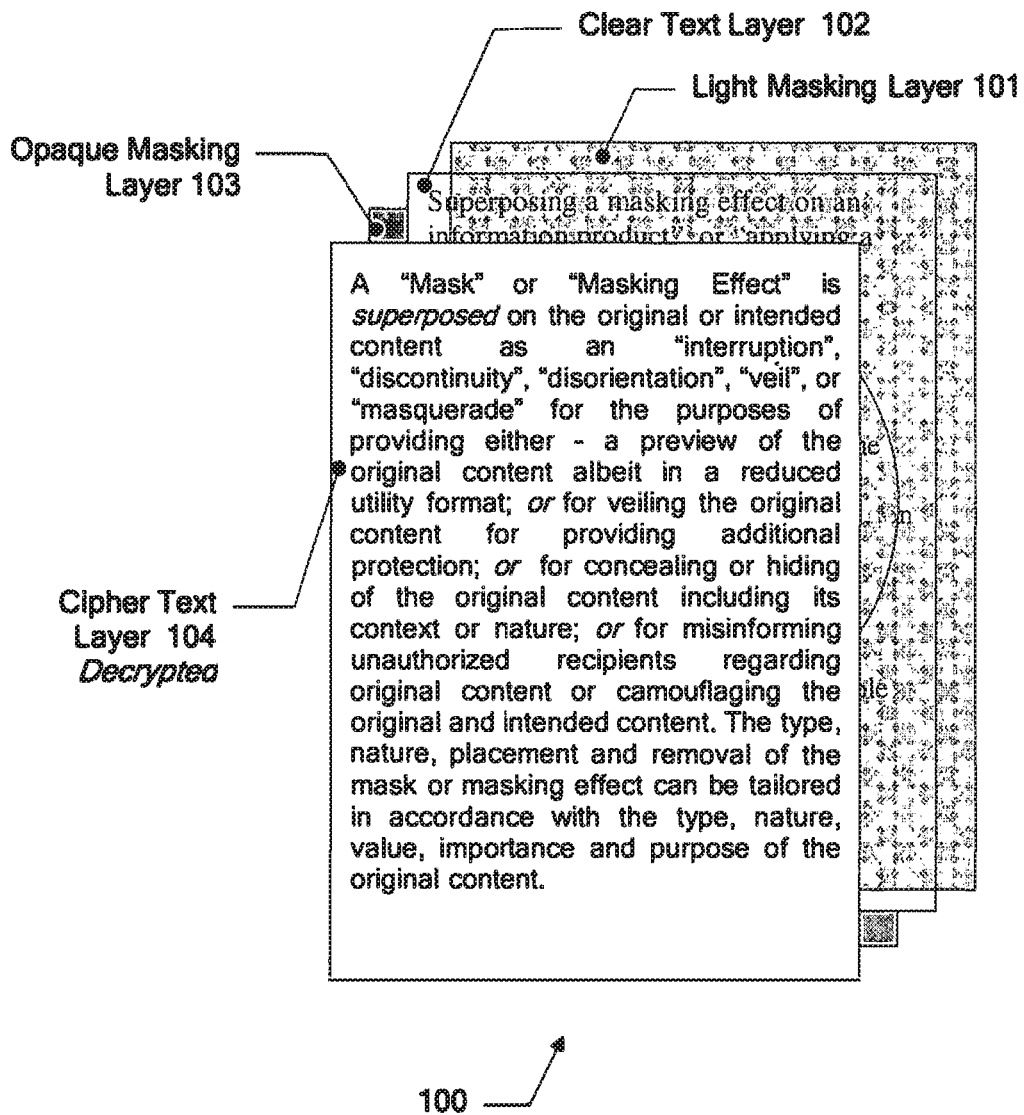
FIG. 14 is an illustrative representation of the digital work of FIG. 10, shown in a second unmasked and decrypted configuration according to still another aspect of the present invention.

FIG. 14 shows the digital work 100 with its Cipher Text Layer 104 decrypted and in its original and intended form.

In FIGS. 10 through 14, the masking effect layers 101 and 103 superpose, interrupt, distort, veil, conceal, masquerade, modify, morph or otherwise interfere with the rendering of the digital content on the digital content layers 102 and 104. In FIGS. 10-14, the masking layer 101 is shown associated with content layer 102; and, masking layer 103 is shown associated with content layer 104. It will be realized that this association is arbitrary and any combination of masking layers with content layers can be implemented. Thus, for instance one masking layer can be associated with a plurality of content layers; or, a plurality of masking layers can be associated with a single content layer. The as-rendered configuration of a particular content layer is determined by the composite plurality of masking effects superimposed thereupon. Thus, the association between masking layers and content layers determines the as-rendered configuration of a digital work and can be controlled by manipulating the characteristics of the masking layer. The association or superposition of a masking layer with or on a content layer is similarly dependent on the nature of the digital work.

In FIGS. 10-14, superposition of the masking layers over the content layers is shown in a spatial manner. It will be realized by those skilled in the art that the masking layers or masking effects are adapted in accordance with the type and nature of digital work 100. Thus, for an audio-visual or multimedia work the masking effect can be either applied in the form of a text, audio, video or graphic and can be either spatial, time-based or a combination thereof. Also masking effects may be spatially static or dynamic; transparent or opaque; continuous or intermittent; rhythmic or irregular or combinations thereof.

Figure 15:
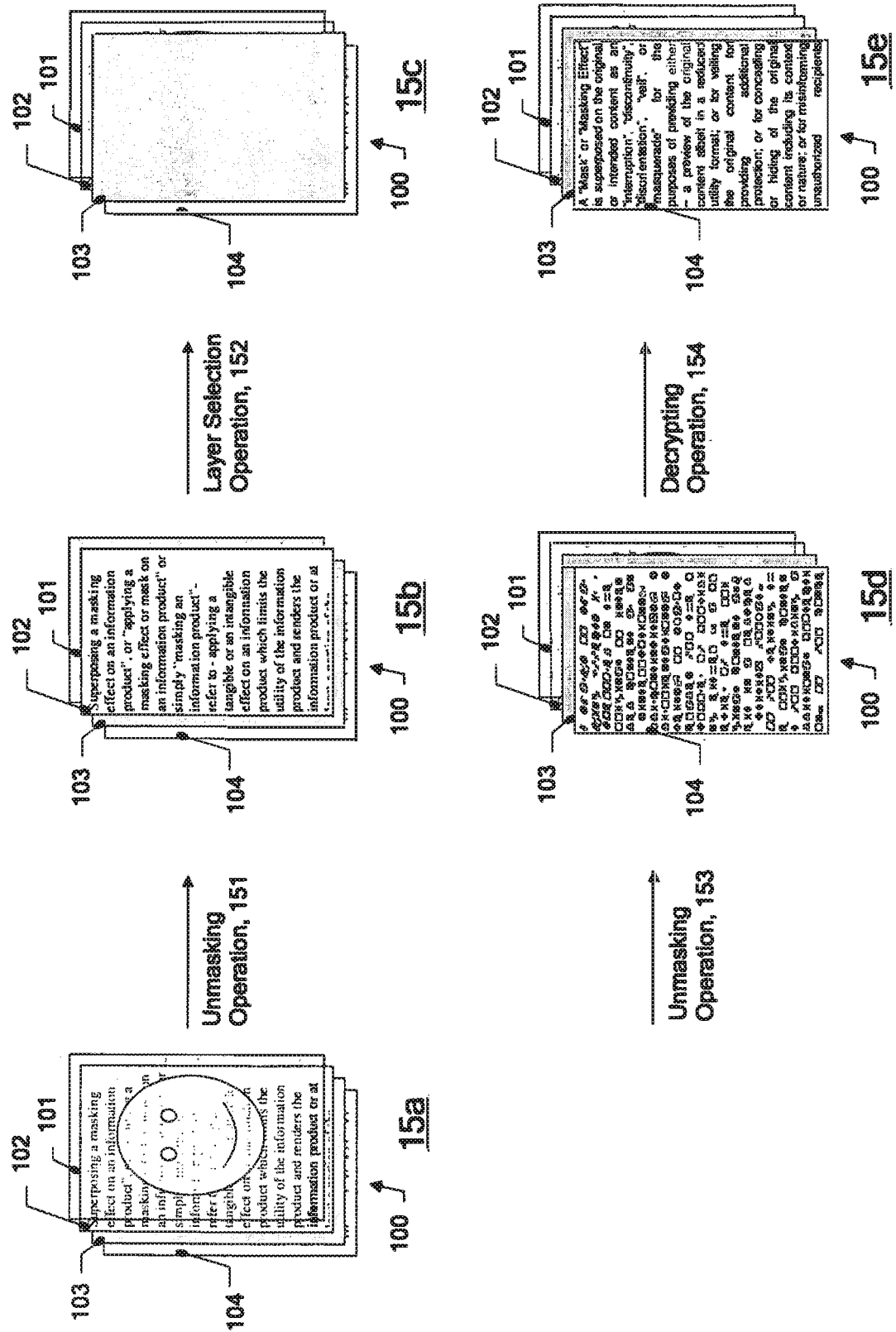
FIG. 15 shows an exemplary sequence of operations for deriving various configurations of the digital work of FIG. 10, according to an embodiment of the present invention.

FIG. 15 shows an exemplary sequence of unmasking and decrypting operations for various configurations of the digital work 100 illustrated in FIGS. 10-14. The various states or configurations of the digital work 100 are indicated by alpha-numerals 15a, 15b, 15c, 15d and 15e. In first masked configuration 15a, Light Masking Layer 101 is superposed over Clear Text Layer 102 and interferes with the content thereon. A first unmasking operation 151 can be performed on first masked configuration 15a to derive digital work 100 in a first unmasked configuration 15b. In the first unmasked configuration 15b of digital work 100, the Clear Text Layer 102 is rendered free of masking in its original format. First unmasking operation 151 may require a code, password or an unmasking key.

After the first unmasking operation 151 is completed other higher security level content can be selected. This selection of higher security level can be referred to as layer selection operation 152. The layer selection operation 152 is serially dependent on the first masking operation 151. In other words, operation 151 must be completed prior to invoking operation 152. This requirement of completing a lower security level unmasking prior to gaining access to higher security level content adds additional redundancy and security.

It will be recognized by those skilled in the art that alternative schemes may be readily devised where a user of digital work 100 may select either layer 102 or 104 for unmasking without necessarily invoking operation 152.

After selecting the higher security level content or layer the user encounters second masked configuration 15c of digital work 100. The second masked configuration 15c shows masking layer 103 superposed over content layer 104. Getting access to layer 104 requires a second unmasking operation 153. Performing the second unmasking operation 153 on second masked configuration 15c yields second unmasked configuration 15d of the digital work 100.

The second unmasked configuration 15d still does not yield access to the contents of the layer 104 as the content is encrypted. Getting access to the content on content layer 104 requires a decrypting operation 154 on second unmasked configuration 15d to derive the final decrypted configuration 15e of digital work 100.

Thus, in the exemplary embodiment described in FIGS. 10-15, getting access to the final decrypted content in digital work 100 requires two unmasking operations, 151 and 152; and one decrypting operation 154. However, the user is granted preview privileges to layer 102 albeit in a masked format, for evaluating digital work 100 and decision-making regarding future purchase.

The unmasking and decrypting operations can be invoked by a code or a key. Having redundant authenticating operations such as unmasking and decrypting provides enhanced security and also enables the content provider for implementing secondary distribution control even after a digital work has been purchased. Multiple unmasking and decrypting procedures enable the digital content provider to combine hardware schemes; software schemes and combinations thereof in addressing digital security issues. As an example, an unmasking operation may be executed strictly in software, while a decrypting operation may be tied to a machine, while still another unmasking operation might require authentication over the web. Thus, for e.g. when a copied version of a digital work is displayed in a different machine only one of the authenticating operations will be validated and executed.

In addition to the content and masking layers a digital work may further include a control layer wherein unmasking key(s) and decrypting key(s) for invoking various unmasking and decrypting operations are included. The control layer may be controlled by the content creator or distributor or both providing the content owners a higher degree of control over the as-rendered configuration of the digital work. Thus, the owner can retain control over rendering of the digital work, in accordance with the previously discussed scheme of "Owner Controlled Rendering by Masking" or OCRM.

Stealth Information Products (SIPs):

According to another embodiment of the present invention, digital content masking can serve as a content disguising mechanism or means for transmitting sensitive information in a masked configuration. A simple and innocuous-appearing information product can be employed for delivering mission-critical encrypted information, in an inconspicuous and discreet manner, by using masking layers. In the context of the present invention, such an information product is referred to as a stealth digital object or stealth information product (SIP).

In a typical SIP, the viewable masking layers contain ordinary or public-domain digital content, while the intended and secure content simply appears un-viewable or is simply veiled by the superposed non-sensitive digital content. Transmitting sensitive digital content in a masked configuration offers the potential of substantially reducing the probability of tampering, suspicion and interception during electronic content transmittals.

Figure 16:
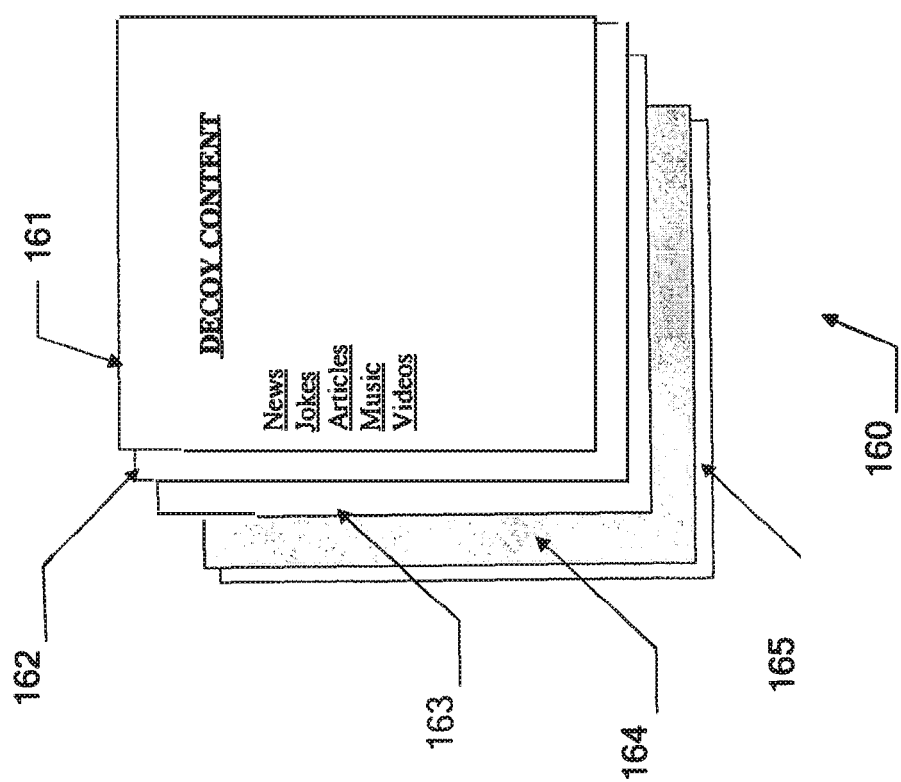
FIG. 16 is an illustrative representation of a Stealth Information Product according to another embodiment of the invention.

FIG. 16 shows a version of an exemplary stealth information product, 160 in its masked or innocuous state. Since, the primary purpose of a mission-critical information product is to deliver secure information in an inconspicuous and discreet manner to its intended recipient, the default state of the stealth information product, 160 is the masked state.

Stealth information product, 160 comprises a plurality of layers indicated by reference numerals 161, 162, 163, 164 and 165. Layers 161, 162, and 163, serve as decoy masking layers and render the semblance of a self-standing document carrying innocuous content. It will be again appreciated by those skilled in the art that the difference between content layers and masking layers is arbitrary—a content layer can serve as a masking layer, and a masking layer may carry content. The intended secure content represented by layer 165 appears as non-viewable or non-accessible content due to the presence of an opaque screen or masking layer 164. In the exemplary demonstration in FIG. 16, opaque masking layer 164 is superposed over secured digital content in layer 165 and is shown grayed out.

FIGS. 17a-17c show exemplary configurations of the intended secure content layer 165 of the stealth information product 160. FIG. 17a shows the content layer 165 in its masked state with masking layer 164 superposed thereupon. Removal of masking layer 164 requires an unmasking procedure 171. FIG. 17b shows the content layer 165 in its unmasked state, however, the "cipher text" content is still unusable due to the encrypted nature of the underlying content. Thus, unmasking procedure 171 must be followed by a decrypting procedure 172 to gain access to the underlying content on layer 165. FIG. 16c shows the content layer 165 in its decrypted state which shows the underlying content in "clear text" format. Thus, in FIGS. 17a through 17c the access protocol for retrieving the information on content layer 165, requires two secure procedures namely, unmasking procedure 171 and decrypting procedure 172.

Specific protocols for unmasking procedure 171 may include pre-established criteria including—a password, an unmasking key, a digital certificate, a software device, a specialized hardware, a fingerprint or other biometric input or other authentication procedures known in the art. Similarly, decryption procedure 172 may be based on a decrypting key or other hardware based decryption procedures known in the art.

The purpose of having a series of authentication procedures prior to providing access to the underlying content enhances the security of the underlying content. To further protect the underlying content the stealth information product can be equipped with anti-tampering features which work in unison with pre-established content-access-conditions (CACs). If the content access conditions are not met in accordance with pre-determined criteria, a self-destructive feature is executed and the stealth information product is rendered useless due to the potential threat of compromised security.

Such content access conditions may include for e.g. a maximum time-elapse condition between the two procedures—unmasking and decrypting, in effect, requiring that the decryption procedure be performed within a certain time interval after the execution of the unmasking procedure. If the decryption procedure is not performed within the predetermined time interval the underlying content can be rendered unusable or unreadable. Other content access conditions may provide for a limited number of failures for the unmasking and decryption procedures beyond which the information product is rendered unusable. Incorporating content-access conditions to the unmasking and decrypting procedures provides a further element of protection to the SIP.

Figure 18:
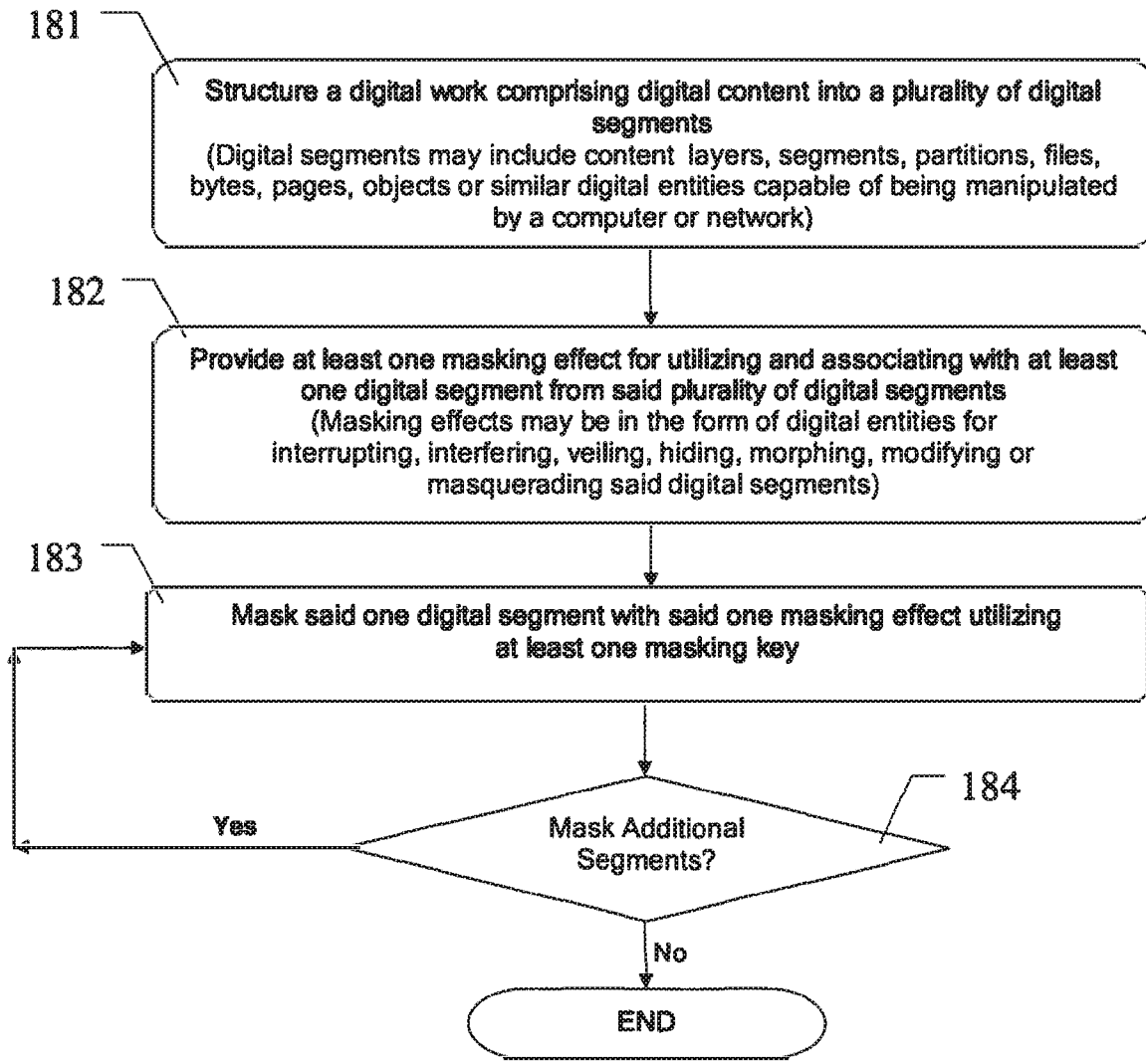
FIG. 18 is a flow chart showing the operations for implementing a masking protection scheme according to an embodiment of the invention.

FIG. 18 is an illustrative flow chart for implementing the content protection scheme utilizing masking according to an embodiment of the present invention. As shown in FIG. 18, a digital work is structured into a plurality of digital segments (step 181). The term digital segments connotes any digital entity capable of being manipulated by a computer or network and includes content layers, files, pages, objects, text, audio, video, etc. This process may be performed during the creation of digital work or subsequently thereafter. Once the digital work is structured into a plurality of segments, then at least one masking effect is selected for association with at least one digital segment (step 182). The masking effect can be chosen from a plurality of available masking effects; and, in fact a library of masking effects may be available for the user to choose from and apply to a selected digital segment. Thereafter, a selected masking effect is applied to one or more digital segments by utilizing at least one masking key (step 183). This process is repeated for additional desired digital segments that are to be masked using one or more masking keys (step 184). Thus, a plurality of digital segments can be masked with a corresponding plurality of masking effects and masking keys in a sequential fashion. Alternately, a plurality of digital segments can be masked with one masking effect and a corresponding masking key in a single step.

Figure 19:
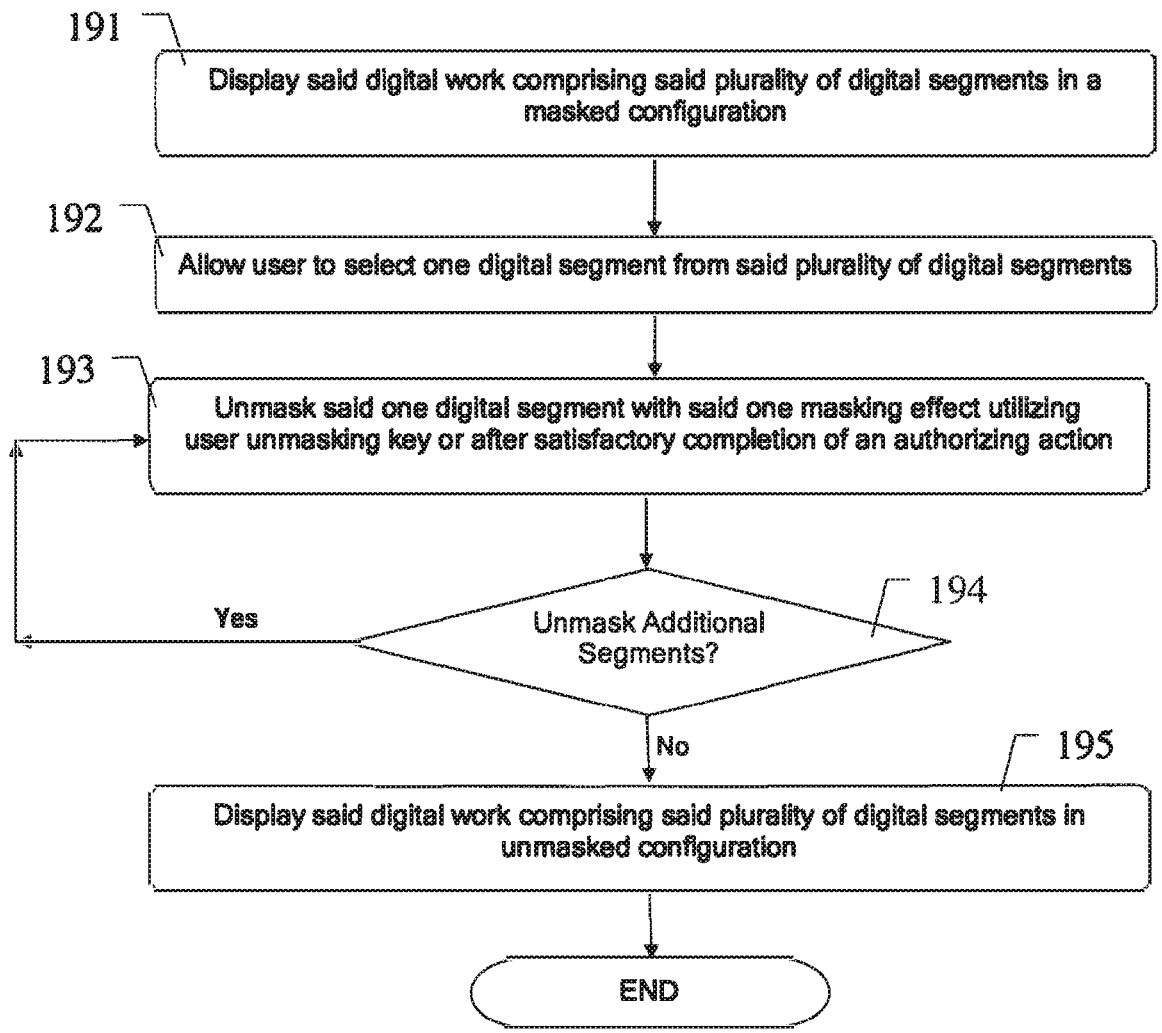
FIG. 19 is a flow chart for retrieving a digital work in an unmasked configuration according to an embodiment of the invention.

FIG. 19 is an illustrative flow chart for retrieving a digital work in an unmasked configuration according to an embodiment of the invention. Initially the digital work would be displayed or rendered in a masked configuration wherein at least one digital segment among a plurality of digital segments would be masked (step 191). Thereafter, the user selects one masked segment from said plurality of digital segments to be unmasked (step 192). User unmasks at least one masked digital segment utilizing an unmasking key or procedure or authorizing action (step 193). User continues with the process of unmasking additional segments (step 194). User then displays/accesses the digital work in an unmasked configuration (step 195).

Figure 20:
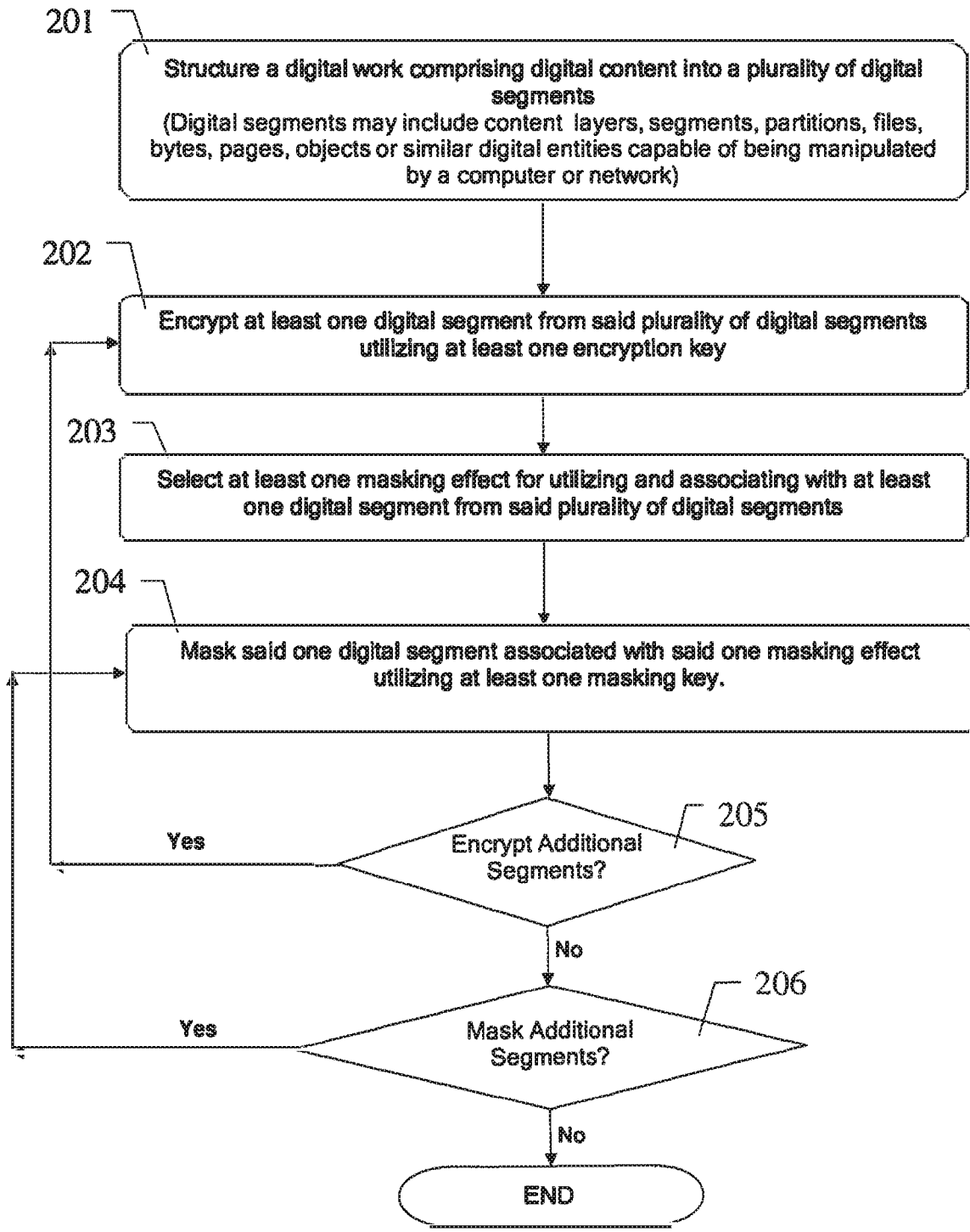
FIG. 20 is a flow chart showing the operations for implementing a composite encrypting and masking scheme according to another embodiment of the invention.

FIG. 20 is an illustrative flow chart for implementing content protection scheme utilizing masking and encrypting according to another embodiment of the invention. As shown in FIG. 20, a digital work is structured into a plurality of digital segments (step 201). This process may be performed during the creation of digital work or subsequently thereafter. Again, the term digital segments includes content layers, files, pages, objects, text, audio, video, etc. Once the digital work is structured into a plurality of segments, then at least one digital segment is encrypted utilizing an encryption key (step 202). Thereafter a masking effect is selected for association with at least one digital segment (step 203). The masking effect can be chosen from a plurality of available masking effects or a library thereof. Thereafter, a selected masking effect is applied to one or more digital segments by utilizing at least one masking key (step 204). It will be realized that the selected masking effect can be applied to an encrypted digital segment from step 202, or to an unencrypted digital segment from said plurality of digital segments, or to both encrypted and non-encrypted digital segments. Thereafter the encryption step can be repeated for encrypting additional digital segments using one or more encryption keys (step 205). Thereafter, other encrypted and remaining unencrypted digital segments can be masked with a corresponding plurality of masking effects and masking keys in a sequential fashion (step 206). Alternately, a plurality of digital segments can be masked with one masking effect and a corresponding masking key in a single step.

Figure 21:
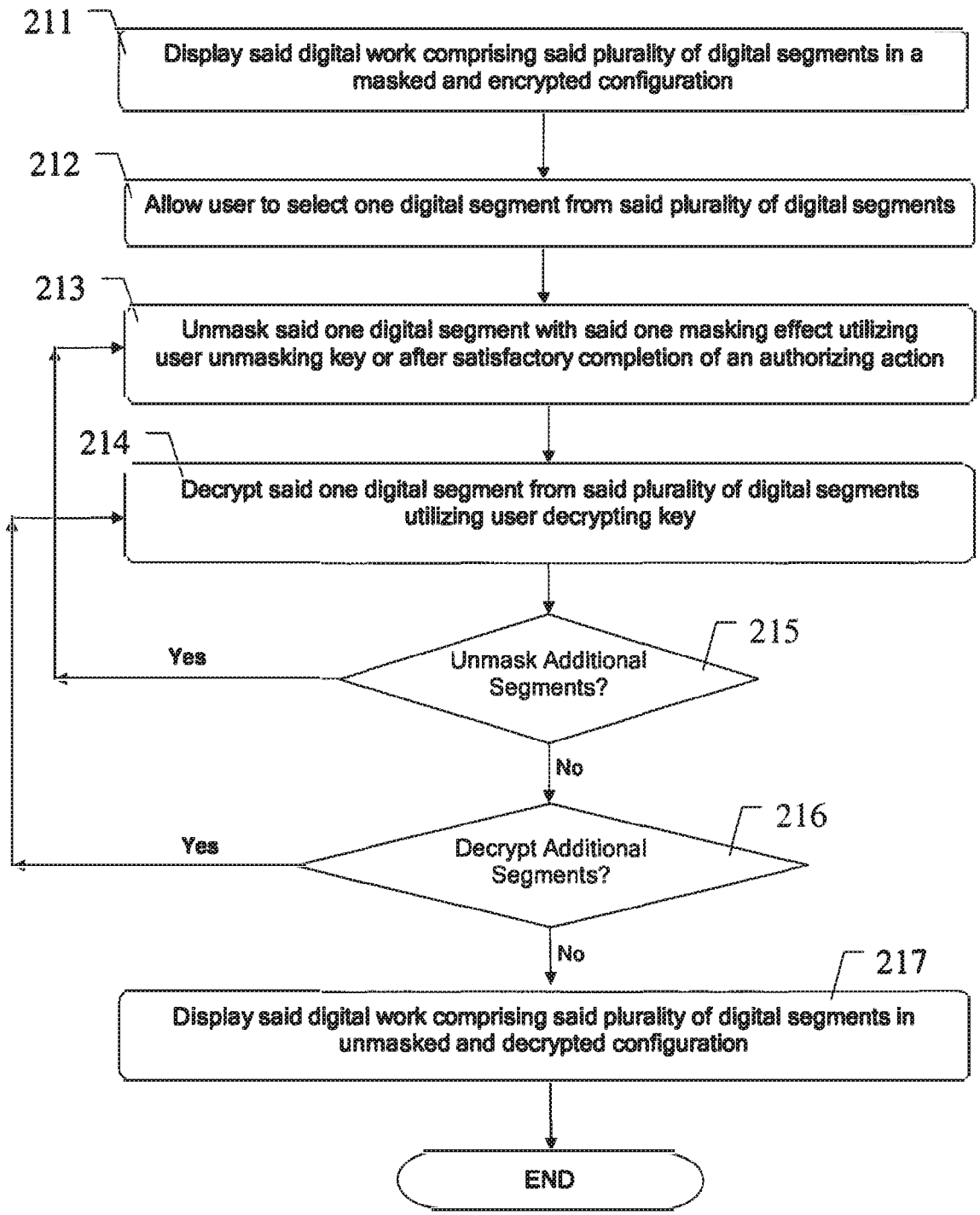
FIG. 21 is a flow chart for retrieving a digital work in an unmasked and decrypted configuration according to another embodiment of the invention.

FIG. 21 is an illustrative flow chart for retrieving a digital work in an unmasked and decrypted configuration according to an embodiment of the invention. Initially the digital work would be displayed or rendered in a masked and encrypted configuration wherein at least one digital segment among a plurality of digital segments would be masked and at least one segment would be encrypted (step 211). Thereafter, the user selects one masked segment from said plurality of digital segments to be unmasked (step 212). User unmasks at least one masked digital segment utilizing an unmasking key or procedure or authorizing action (step 213). Thereafter, user decrypts one of the encrypted digital segments from said plurality of digital segments utilizing a user decrypting key (step 214). User continues with the process of unmasking additional segments (step 215) and decrypting additional segments (step 216). User displays or accesses digital work in an unmasked and decrypted configuration (step 217).

Exemplary Commercial Applications and Embodiments—Books, Printed Matter, Other Information Products:

The primary method of distribution of commercially valuable digital content is providing no access to the "content object" or "the body of the document or digital work" unless some form of payment has been received from the user. The common approach for distributing and selling books, or printed matter electronically or via the Internet is providing a list of titles and providing for preview one of the following—an image view of the individual pages, an abstract, excerpts from the book, a brief description of the contents or the Table of Contents, and/or testimonials of readers. These glimpses of the digital work are often insufficient for the customer for making a purchase decision and inevitably affect the quality of the purchase decision. The quality of a purchase decision is directly linked to "Information at the Point of Purchase" (IPOP). More information at the point of purchase generally leads to better purchase decisions. In the case of books and other printable matter, preview information prior to purchase received online or via Internet is of an inferior quality compared to that obtained by a reader during a physical trip to the local bookstore and actually examining the printed book, in its entirety, prior to purchase. Providing a preview version of the book or similar information product in a masked form to make a purchase decision will yield more informed purchase decisions, more IPOP and will eventually enhance sales. Again the success of any technical or technological innovation is also linked to the creative sales and marketing strategies to deploy it.

In one of the business methods or commercial scenarios, according to an embodiment of the invention, the preview or masked version, of a given book or information product, is made available for free and the user is allowed to examine the underlying content to make a purchase decision. The preview or masked version of the information product may be made available to the user for download; or for previewing electronically via the internet on a website or broadcast page; or via a Compact Disc or similar storage medium.

A particular business method for deploying masking and masked preview versions is to allow a customer to access a preview version of a particular book, report or similar information product at a substantially reduced cost of the original information product or book; thereafter, the customer is allowed a certain period of time to make a purchase decision for purchasing the entire book at a discounted price. The discounted price could further feature a price adjustment for the amount paid for the preview version. Thus, the customer is offered the facility to examine a preview version of a book or other information product at a substantially reduced price along with an "option" for purchase of the original book or information product within a certain time period at a discounted price. The combined preview facility of an information product along with an option of subsequent purchase provides a quantum leap in selling information products over a network such as the Internet and somewhat equalizes the quality of examination available to a user at the local book store and that available online. It will be readily realized that the masked preview version sold at a reduced cost to the entire information product is by itself a derived information product and could take a variety of forms.

The "option" for subsequent purchase at a discounted price may have a fixed value or may also be designed to decline in value with time and cease to exist after a certain time period. Thus, as an example, if a consumer returns for purchase of the original book within say 24 hours he/she will pay less than if the consumer waited for one week, which in turn would be less than if the consumer waited for one month prior to making the purchase decision. Thus, the shorter the time lag between the purchase of the preview version and the original version the higher the discount rate available to a customer.

Another business model for deploying preview versions of an information product or a book is to sell content piecemeal, wherein the published form barrier is broken and the content is separated from the physical artifact form e.g. book, newspaper, or magazine. In this model a preview masked or unmasked version of a portion or chapter from a book or information product at a reduced price relative to the overall information product or book; thereafter, the customer is allowed a certain time period for purchasing the entire information product at a discounted price as an adjustment towards prior purchase of the preview version. As an example, a book summary may be included as a preview material, which is sold at a reduced cost of the overall book. As another illustrative example, each individual chapter in a multi-chapter book may be assigned a selling price for allowing the customers to purchase a specific chapter of the book for purchase evaluation purposes. Furthermore, the chapters purchased for preview would be delivered electronically and thus distribution costs for the seller and the need to store multiple copies of the individualized chapters would be avoided. The final purchase version of the book may still be in the traditional printed format.

In yet another business model, the preview version of a given information product is dynamically generated or customized in accordance with customer input or relevance criteria specified by the customer. Relevance criteria specified by the customer may include standard keyword search terms; key phrase; keyword concentration in a specific section of the information product; type of content within the information product such as text, pictures, audio or video. In addition, customization of an information product may be executable in accordance with regular Boolean operators—AND, OR, AND NOT etc. known in the art. To ensure that availability of such customization or customized preview will not deter subsequent purchase by the customer, a masking effect may be further incorporated with the preview version of the information product. Furthermore such customized versions of the main information product may also carry a variable price tag associated therewith. As an illustrative example, say an interested user after searching a multi-chapter book in accordance with a specific keyword or idea came up with four (4) distinct chapters that had a considerable concentration of that specific keyword or phrase; then, the user may be offered the facility of purchasing any one or more of the four chapters of the book for preview at a price in accordance with the number of chapters purchased. Thus, the preview version of a given information product is not static or pre-created, but is dynamically derived or created ad hoc according to the criteria specified by the user for the purposes of providing a highly-relevant and customized preview of the main information product.

In its simplest form the method of generating a preview version of an information product comprises receiving at least one search input from a user for previewing said information product; selecting at least one relevant portion from said information product in accordance with said search input; configuring said preview version of said information product wherein said preview version includes at least said relevant portion; and allowing the user to access said preview version.

According to another embodiment of the invention, a method of generating a preview version of an information product comprises receiving at least one search input from a user for previewing said information product; selecting at least one relevant portion from said information product in accordance with said search input; excerpting said relevant portion from said information product thereby creating an excerpted relevant portion; allowing the user to access said excerpted relevant portion of said information product.

The above methods for selling books are equally applicable for other information products including DVDs, music, audio, movies, etc.

Exemplary Commercial Applications and Embodiments—Software and Rendering Applications:

As discussed hereinabove particularly in conjunction with FIGS. 6a-6d, 7a-7c, and 8a-8b, a rendering application or software can be utilized for delivering and distributing an information product having a masking effect applied thereto. The distribution software or a rendering applications according to the current invention can be titled ARCCM or OCRM software applications. OCRM Software can be devised to render masked content for preview purposes and also prevent unauthorized copying. An OCRM software can be installed on a personal computer, network server or similar systems. OCRM software includes a rendering protocol facility for controlling the as-rendered configuration of the information product in a preview (masked) form or intended (unmasked) form. OCRM software also includes a rendering protocol interface for defining the specific content portions that will be delivered in a masked form or unmasked form.

According to an embodiment of the invention, data is stored in an encrypted format and then decrypted by the OCRM software with a masking effect imposed upon the decrypted data in accordance with a pre-defined rendering protocol. The masking effect can be removed upon payment of due consideration, or after completion of a qualifying action.

OCRM software can comprise additional security features for preventing unauthorized copying. In an embodiment of the invention, the masking effect removal will only be effective for a particular installation of OCRM software. Thus, the default rendering protocol or as-rendered configuration for a given information product is the masked configuration, while the unmasked configuration can only be accessed upon payment of due consideration or completion of a qualifying action. The unmasking or re-setting of the rendering protocol is "Content Owner Controlled" and is limited to either the specific installation of the OCRM software or a specific machine. Therefore, the information product or content exists in a default masked configuration and copied versions of information products are still rendered or displayed in a masked form on a different installation of the OCRM software or a different machine. To further achieve these objectives, the OCRM software has a tracking facility for keeping track of the status of a particular content package or information product. The as-rendered configuration of a digital work, rendered by the OCRM software, is thus determined by the nature of the digital work, the default masking effect provided by the OCRM software and the rendering protocol established for that digital work for that specific installation of the OCRM software on a certain hardware. Thus, copied versions of the digital work may still be transferred to another OCRM software installation existing on a different hardware but the rendering protocol settings are by default set to masked on any specific installation unless activated by the Content Owner.

For instance, OCRM software can be installed in MACHINE-A for USER-A and MACHINE-B for USER-B; a digital work or CONTENT-D having its rendering protocol set to masked is supplied to USER-A and retrieved on MACHINE-A in a masked form; the masked form of CONTENT-D is represented as CONTENT-D (masked). After USER-A examines CONTENT-D (masked), USER-A pays for CONTENT-D to the content provider or completes a qualifying action for the rendering protocol to be modified remotely by the content provider. USER-A is then able to display and playback the original CONTENT-D in an unmasked form, represented by CONTENT-D (unmasked), on his/her MACHINE-A. Thereafter, USER-A tries to copy CONTENT-D (unmasked) and distribute it to USER-B; USER-B retrieves the digital work sent by USER-A on MACHINE-B but is only able to access CONTENT-D (masked) for purchase evaluation as USER-B's OCRM installation has not been activated for CONTENT-D (unmasked). Furthermore, the copy operation by USER-A is only effective for the content portion and not for the rendering protocol settings portion, which are "Content Owner Controlled."

While the drawings and the specification detail certain exemplary embodiments of the invention, it should be recognized that these are provided in a generic and descriptive sense for the purposes of illustration and not for purposes of limitation. For instance, it would be readily apparent to those skilled in the art that software components of the invention could be operationally implemented in hardware; or various functional steps could be collapsed or expanded. Accordingly various alterations, modifications and adaptations can be made to this invention without departing from the spirit and scope of the invention as delineated in the following claims.

What is claimed is:

1. A method of distributing and transmitting a digital work, comprising:
receiving a request for a digital work and a criteria from a customer;
creating, in response to receiving the request and the criteria, a masked digital work by adding one or more masking effect layers to an original form of the digital work to add a masking effect to the original form of the digital work, the masking effect being dynamically generated by selecting the one or more masking effect layers to add to the original form of the digital work based at least in part on the criteria received from the customer, the masking effect being of a utility-reducing character and adapted to affect at least one aspect of the original form of the digital work selected from a group consisting of display, audio, playback quality, and resolution of the digital work;
transmitting, in response to the request, the masked digital work;
receiving, in response to transmitting the masked digital work, a further communication relating to the digital work;
evaluating whether the further communication satisfies one of a plurality of predetermined criteria; and
in response to the further communication satisfying a first predetermined criteria transmitting the digital work in the original form,
wherein the criteria from the customer includes a search term that is used to generate a selected relevant portion of the digital work, the masking effect being adapted to affect at least a portion of the digital work determined to be outside of the selected relevant portion.

2. The method according to claim 1, wherein an aspect of the digital work is determined to be relevant to the customer based at least in part on the criteria received from the customer, wherein the masking effect is dynamically generated based at least in part on the relevance determination.

3. The method according to claim 1, further comprising:
in response to the further communication satisfying a second predetermined criteria transmitting a portion of the digital work.

4. The method according to claim 1, wherein satisfying a first predetermined criteria comprises receiving authentication information from an entity requesting the digital work.

5. The method according to claim 1, wherein creating the masking effect affects two or more aspects of the digital work selected from a group consisting of display, audio, playback quality, and resolution of the digital work.

6. The method according to claim 5, wherein a modified masked digital work is created by removing a masking effect that affects at least one of the two or more aspects of the digital work.

7. The method according to claim 2, further comprising:
providing an interface for the customer to specify the criteria used to select the masking effect.

8. An apparatus comprising:
a processor configured to:
receive a request for a digital work and a criteria from a customer;
create, in response to receiving the request and the criteria, a masked digital work by adding one or more masking effect layers to an original form of the digital work to add a masking effect to the original form of the digital work, the masking effect being dynamically generated by selecting the one or more masking effect layers to add to the original form of the digital work based at least in part on the criteria received from the customer, the masking effect being of a utility-reducing character and adapted to affect at least one aspect of the original form of the digital work selected from a group consisting of display, audio, playback quality, and resolution of the digital work;
transmit, in response to the request, the masked digital work;
receive, in response to transmitting the masked digital work, a further communication relating to the digital work;
evaluate whether the further communication satisfies one of a plurality of predetermined criteria; and
in response to the further communication satisfying a first predetermined criteria transmit the digital work in the original form,
wherein the criteria from the customer includes a search term that is used to generate a selected relevant portion of the digital work, the masking effect being adapted to affect at least a portion of the digital work determined to be outside of the selected relevant portion.

9. The apparatus of claim 8, wherein an aspect of the digital work is determined to be relevant to the customer based at least in part on the criteria received from the customer, wherein the masking effect is dynamically generated based at least in part on the relevance determination.

10. The apparatus of claim 8, wherein the processor is further configured to:
in response to the further communication satisfying a second predetermined criteria transmit a portion of the digital work.

11. The apparatus of claim 8, wherein satisfying a first predetermined criteria comprises receiving authentication information from an entity requesting the digital work.

12. The apparatus of claim 8, wherein the masking effect affects two or more aspects of the digital work selected from a group consisting of display, audio, playback quality, and resolution of the digital work.

13. The apparatus of claim 8, wherein the processor is further configured to:
provide an interface for the customer to specify the criteria used to select the masking effect.

14. A non-transitory computer-readable medium having instructions stored thereon, the instructions upon executing causing a processor to perform step comprising:
receiving a request for a digital work and a criteria from a customer;
creating, in response to receiving the request and the criteria, a masked digital work by adding one or more masking effect layers to an original form of the digital work to add a masking effect to the original form of the digital work, the masking effect being dynamically generated by selecting the one or more masking effect layers to add to the original form of the digital work based at least in part on the criteria received from the customer, the masking effect being of a utility-reducing character and adapted to affect at least one aspect of the original form of the digital work selected from a group consisting of display, audio, playback quality, and resolution of the digital work;
transmitting, in response to the request, the masked digital work;
receiving, in response to transmitting the masked digital work; a further communication relating to the digital work;
evaluating whether the further communication satisfies one of a plurality of predetermined criteria; and
in response to the further communication satisfying a first predetermined criteria transmitting the digital work in the original form,
wherein the criteria from the customer includes a search term that is used to generate a selected relevant portion of the digital work, the masking effect being adapted to affect at least a portion of the digital work determined to be outside of the selected relevant portion.

15. The non-transitory computer-readable medium of claim 14, wherein an aspect of the digital work is determined to be relevant to the customer based at least in part on the criteria received from the customer, wherein the masking effect is dynamically generated based at least in part on the relevance determination.

16. The non-transitory computer-readable medium of claim 14, wherein the instructions further comprise:
in response to the further communication satisfying a second predetermined criteria transmitting a portion of the digital work.

17. The non-transitory computer-readable medium of claim 14, wherein satisfying a first predetermined criteria comprises receiving authentication information from an entity requesting the digital work.

18. The non-transitory computer-readable medium of claim 14, wherein creating the masking effect affects two or more aspects of the digital work selected from a group consisting of display, audio, playback quality, and resolution of the digital work.

19. The non-transitory computer-readable medium of claim 18, wherein a modified masked digital work is created by removing a masking effect that affects at least one of the two or more aspects of the digital work.

20. The non-transitory computer-readable medium of claim 15, wherein the instructions further comprise:
providing an interface for the customer to specify the criteria used to select the masking effect.

21. The apparatus of claim 8, wherein the processor is further configured to:
in response to the further communication satisfying a second predetermined criteria transmit a modified masked digital work in which a portion of the masking effect is removed from the digital work.

22. The non-transitory computer-readable medium of claim 14, wherein the instructions further comprise:
in response to the further communication satisfying a second predetermined criteria transmitting a modified masked digital work in which a portion of the masking effect is removed from the digital work.

23. A method of distributing and transmitting a digital work, comprising:
receiving a request for a digital work and a criteria from a customer;
creating a masked digital work by adding one or more masking effect layers to an original form of the digital work to add a masking effect to the original form of the digital work, the masking effect being dynamically based at least in part on the criteria received from the customer, the masking effect being of a utility-reducing character and adapted to affect at least one aspect of the original form of the digital work selected from a group consisting of display, audio, playback quality, and resolution of the digital work;
transmitting, in response to the request, the masked digital work;
receiving, in response to transmitting the masked digital work, a further communication relating to the digital work;
evaluating whether the further communication satisfies one of a plurality of predetermined criteria; and in response to the further communication satisfying a first predetermined criteria transmitting the digital work in the original form, wherein the criteria from the customer includes a search term, the masking effect being adapted to affect at least a portion of the digital work determined to not be relevant to the search term.

\* \* \* \* \*